US010899531B2

(12) United States Patent
Sollie et al.

(10) Patent No.: US 10,899,531 B2
(45) Date of Patent: Jan. 26, 2021

(54) MODULAR BOX ASSEMBLY

(71) Applicant: Pratt Retail Specialties, LLC, Conyers, GA (US)

(72) Inventors: Greg Sollie, Sharpsburg, GA (US); Jamie Waitermire, Peachtree City, GA (US); Shifeng Chen, Newport News, GA (US)

(73) Assignee: Pratt Retail Specialties, LLC, Conyers, GA (US)

( * ) Notice: Subject to any disclaimer, the term of this patent is extended or adjusted under 35 U.S.C. 154(b) by 0 days.

(21) Appl. No.: 16/552,277

(22) Filed: Aug. 27, 2019

(65) Prior Publication Data
US 2019/0382186 A1 Dec. 19, 2019

Related U.S. Application Data

(63) Continuation of application No. 15/845,545, filed on Dec. 18, 2017, now Pat. No. 10,507,968.

(51) Int. Cl.
*B65D 81/38* (2006.01)
*B65D 5/48* (2006.01)
(Continued)

(52) U.S. Cl.
CPC ....... *B65D 81/3862* (2013.01); *B65D 5/3678* (2013.01); *B65D 5/4295* (2013.01);
(Continued)

(58) Field of Classification Search
CPC ............ B65D 81/3862; B65D 81/3858; B65D 5/4295; B65D 5/46016; B65D 5/3678;
(Continued)

(56) References Cited

U.S. PATENT DOCUMENTS 265,985 A 10/1882 Seabury
1,527,167 A 2/1925 Birdseye
(Continued)

FOREIGN PATENT DOCUMENTS

CA 2019104 12/1991
CN 206494316 9/2017
(Continued)

OTHER PUBLICATIONS

US 10,562,676 B2, 02/2020, Waltermire et al. (withdrawn)
(Continued)

*Primary Examiner* — Kareen K Thomas
(74) *Attorney, Agent, or Firm* — Taylor English Duma LLP

(57) ABSTRACT

A modular box assembly includes a box having a top end, an opposed bottom end, and side panels extending from the top end to the bottom end. A bottom panel is disposed at the bottom end such that the side panels and the bottom panel define a box cavity and the top end defines a box opening. A shoulder is attached to two side panel and extends inward from the side panels into the box cavity, wherein each shoulder is spaced from the top end a predetermined distance. A box top covers the box opening, the box top being selectively movable about and between a closed position and an open position. In the closed position, the top panel engages the shoulders to support the top panel, and in the closed position an upper surface of the top panel is substantially flush with the top end of the box.

12 Claims, 17 Drawing Sheets

(51) Int. Cl.
  *B65D 5/46* (2006.01)
  *F25D 3/14* (2006.01)
  *B65D 5/42* (2006.01)
  *B65D 5/36* (2006.01)

(52) U.S. Cl.
  CPC ..... *B65D 5/46016* (2013.01); *B65D 5/46072* (2013.01); *B65D 5/48012* (2013.01); *B65D 81/3858* (2013.01); *F25D 3/14* (2013.01); *F25D 2303/0844* (2013.01)

(58) Field of Classification Search
  CPC ............ B65D 5/48012; B65D 5/46072; B65D 85/546; B65D 5/48034; B65D 5/3607; B65D 5/5405; B65D 5/548; B65D 71/42; B65D 85/1036; B65D 85/325; B65D 5/46064; B65D 5/48044; B65D 5/0075; B65D 5/545; B65D 71/0022; F25D 3/14; F25D 2303/0844
  USPC ....... 220/592.01–592.28; 229/108, 112, 113, 229/114, 117.01, 190, 117.05
  See application file for complete search history.

(56) References Cited

U.S. PATENT DOCUMENTS

| | | |
|---|---|---|
| 1,677,565 A | 7/1928 | Oppenheim |
| 1,682,410 A | 8/1928 | Oppenheim |
| 1,747,980 A | 2/1930 | Kondolf |
| 1,753,813 A | 4/1930 | Washburn |
| 1,868,996 A | 7/1932 | Sharp |
| 1,896,393 A | 2/1933 | Devine |
| 1,899,892 A | 2/1933 | D'Este et al. |
| 1,930,680 A | 10/1933 | Hinton |
| 1,935,923 A | 11/1933 | Thoke |
| 1,937,263 A | 11/1933 | Bubb |
| 1,942,917 A | 1/1934 | D'Este et al. |
| 1,954,013 A | 4/1934 | Lilienfield |
| 2,018,519 A | 10/1935 | Hall |
| 2,070,747 A | 2/1937 | Ostrom |
| 2,116,513 A | 5/1938 | Frankenstein |
| 2,148,454 A | 2/1939 | Gerard |
| 2,165,327 A | 7/1939 | Zalkind |
| 2,289,060 A | 7/1942 | Merkle |
| 2,293,361 A | 8/1942 | Roberts |
| 2,360,806 A | 10/1944 | Van Rosen |
| 2,386,905 A | 10/1945 | Meitzen |
| 2,389,601 A | 11/1945 | De Witt |
| 2,554,004 A | 5/1951 | Bergstein |
| 2,632,311 A | 3/1953 | Sullivan |
| 2,650,016 A | 8/1953 | McMillan |
| 2,753,102 A | 7/1956 | Paige |
| 2,899,103 A | 8/1959 | Ebert |
| 2,927,720 A | 3/1960 | Adams |
| 2,987,239 A | 6/1961 | Atwood |
| 3,029,008 A | 4/1962 | Membrino |
| 3,031,121 A | 4/1962 | Chase |
| 3,065,895 A | 11/1962 | Lipschutz |
| 3,096,879 A | 7/1963 | Schumacher |
| 3,097,782 A | 7/1963 | Koropatkin et al. |
| 3,182,913 A | 5/1965 | Brian |
| 3,193,176 A * | 7/1965 | Gullickson ........ B65D 5/48048 229/117.06 |
| 3,222,843 A | 12/1965 | Schneider |
| 3,236,206 A | 2/1966 | Willinger |
| 3,282,411 A | 11/1966 | Jardine |
| 3,286,825 A | 11/1966 | Laas |
| 3,335,941 A | 8/1967 | Gatward |
| 3,371,462 A | 3/1968 | Nordkvist et al. |
| 3,375,934 A | 4/1968 | Bates |
| 3,420,363 A | 1/1969 | Blickensderfer |
| 3,435,736 A | 4/1969 | Reiche |
| 3,503,550 A | 3/1970 | Main et al. |
| 3,551,945 A | 1/1971 | Eyberg et al. |
| 3,670,948 A * | 6/1972 | Berg ............... B65D 5/48048 229/117.06 |
| 3,703,383 A | 11/1972 | Kuchenbecker |
| 3,734,336 A | 5/1973 | Rankow et al. |
| 3,747,743 A | 7/1973 | Hoffman, Jr. |
| 3,749,299 A | 7/1973 | Ingle |
| 3,836,044 A | 9/1974 | Tilp et al. |
| 3,843,038 A | 10/1974 | Sax |
| 3,880,341 A | 4/1975 | Bamburg et al. |
| 3,887,743 A | 6/1975 | Lane |
| 3,890,762 A | 6/1975 | Ernst et al. |
| 3,980,005 A | 9/1976 | Buonaiuto |
| 4,030,227 A | 6/1977 | Oftedahl |
| 4,050,264 A | 9/1977 | Tanaka |
| 4,068,779 A | 1/1978 | Canfield |
| 4,091,852 A | 5/1978 | Jordan et al. |
| 4,169,540 A | 10/1979 | Larsson et al. |
| 4,211,267 A | 7/1980 | Skovgaard |
| 4,213,310 A | 7/1980 | Buss |
| 4,335,844 A | 6/1982 | Egli |
| 4,342,416 A | 8/1982 | Philips |
| 4,380,314 A | 4/1983 | Langston, Jr. et al. |
| 4,396,144 A | 8/1983 | Gutierrez et al. |
| 4,418,864 A | 12/1983 | Neilsen |
| 4,488,623 A | 12/1984 | Linnell, II et al. |
| 4,509,645 A | 4/1985 | Hotta |
| 4,679,242 A | 7/1987 | Brockhaus |
| 4,682,708 A | 7/1987 | Pool |
| 4,819,793 A | 4/1989 | Willard et al. |
| 4,828,133 A | 5/1989 | Hougendobler |
| 4,830,282 A | 5/1989 | Knight, Jr. |
| 4,889,252 A | 12/1989 | Rockom et al. |
| 4,930,903 A | 6/1990 | Mahoney |
| 4,989,780 A | 2/1991 | Foote et al. |
| 5,016,813 A | 5/1991 | Simons |
| 5,020,481 A | 6/1991 | Nelson |
| 5,062,527 A | 11/1991 | Westerman |
| 5,094,547 A * | 3/1992 | Graham ............. B65D 33/02 220/908.1 |
| 5,102,004 A | 4/1992 | Hollander et al. |
| 5,154,309 A | 10/1992 | Wischusen, III et al. |
| 5,158,371 A | 10/1992 | Moravek |
| 5,165,583 A | 11/1992 | Kouwenberg |
| 5,185,904 A | 2/1993 | Rogers et al. |
| 5,263,339 A | 11/1993 | Evans |
| 5,358,757 A | 10/1994 | Robinette et al. |
| 5,372,429 A | 12/1994 | Beaver, Jr. et al. |
| 5,417,342 A | 5/1995 | Hutchison |
| 5,418,031 A | 5/1995 | English |
| 5,441,170 A | 8/1995 | Bane, III |
| 5,454,471 A | 10/1995 | Norvell |
| 5,491,186 A | 2/1996 | Kean et al. |
| 5,493,874 A | 2/1996 | Landgrebe |
| 5,499,473 A | 3/1996 | Ramberg |
| 5,505,810 A | 4/1996 | Kirby et al. |
| 5,511,667 A | 4/1996 | Carder |
| 5,512,345 A | 4/1996 | Tsutsumi et al. |
| 5,516,580 A | 5/1996 | Frenette et al. |
| 5,562,228 A * | 10/1996 | Ericson ............. A45C 7/0077 62/457.2 |
| 5,573,119 A | 11/1996 | Luray |
| 5,596,880 A | 1/1997 | Welker et al. |
| 5,613,610 A | 3/1997 | Bradford |
| 5,615,795 A | 4/1997 | Tipps |
| 5,638,978 A | 6/1997 | Cadiente |
| 5,775,576 A | 7/1998 | Stone |
| 5,842,571 A | 12/1998 | Rausch |
| 5,906,290 A | 5/1999 | Haberkorn |
| 5,996,366 A | 12/1999 | Renard |
| 6,003,719 A | 12/1999 | Steward, III |
| 6,041,958 A | 3/2000 | Tremelo |
| 6,050,412 A | 4/2000 | Clough et al. |
| 6,138,902 A | 10/2000 | Welch |
| 6,164,526 A | 12/2000 | Dalvey |
| 6,168,040 B1 | 1/2001 | Sautner et al. |
| 6,220,473 B1 | 4/2001 | Lehman et al. |
| 6,223,551 B1 | 5/2001 | Mitchell |
| 6,238,091 B1 | 5/2001 | Mogil |
| 6,244,458 B1 | 6/2001 | Frysinger et al. |

(56) References Cited

U.S. PATENT DOCUMENTS

| | | |
|---|---|---|
| 6,247,328 B1 | 6/2001 | Mogil |
| 6,295,830 B1 | 10/2001 | Newman |
| 6,295,860 B1 | 10/2001 | Sakairi et al. |
| 6,308,850 B1 | 10/2001 | Coom et al. |
| 6,325,281 B1 | 12/2001 | Grogan |
| 6,443,309 B1 | 9/2002 | Becker |
| 6,453,682 B1 | 9/2002 | Jennings et al. |
| 6,478,268 B1 | 11/2002 | Bidwell et al. |
| 6,510,705 B1 | 1/2003 | Jackson |
| 6,582,124 B2 | 6/2003 | Mogil |
| 6,618,868 B2 | 9/2003 | Minnick |
| 6,688,133 B1 | 2/2004 | Donefrio |
| 6,725,783 B2 | 4/2004 | Sekino |
| 6,726,017 B2 | 4/2004 | Maresh et al. |
| 6,736,309 B1 | 5/2004 | Westerman et al. |
| 6,771,183 B2 | 8/2004 | Hunter |
| 6,821,019 B2 | 11/2004 | Mogil |
| 6,837,420 B2 | 1/2005 | Westerman et al. |
| 6,868,982 B2 | 3/2005 | Gordon |
| 6,875,486 B2 | 4/2005 | Miller |
| 6,899,229 B2 | 5/2005 | Dennison et al. |
| 6,910,582 B2 | 6/2005 | Lantz |
| 6,971,539 B1 | 12/2005 | Abbe |
| 7,000,962 B2 | 2/2006 | Le |
| 7,019,271 B2 | 3/2006 | Wnek et al. |
| 7,094,192 B2 | 8/2006 | Schoenberger et al. |
| 7,140,773 B2 | 11/2006 | Becker et al. |
| 7,225,632 B2 | 6/2007 | Derifield |
| 7,225,970 B2 | 6/2007 | Philips |
| 7,229,677 B2 | 6/2007 | Miller |
| 7,264,147 B1 | 9/2007 | Benson et al. |
| 7,392,931 B2 | 7/2008 | Issler |
| 7,452,316 B2 | 11/2008 | Cals et al. |
| D582,676 S | 12/2008 | Rothschild |
| 7,597,209 B2 | 10/2009 | Rothschild et al. |
| 7,607,563 B2 | 10/2009 | Hanna et al. |
| 7,677,406 B2 | 3/2010 | Maxson |
| 7,681,405 B2 | 3/2010 | Williams |
| 7,784,301 B2 | 8/2010 | Sasaki et al. |
| 7,807,773 B2 | 10/2010 | Matsuoka et al. |
| 7,841,512 B2 | 11/2010 | Westerman et al. |
| 7,845,508 B2 | 12/2010 | Rothschild et al. |
| 7,870,992 B2 | 1/2011 | Schille et al. |
| 7,909,806 B2 | 3/2011 | Goodman et al. |
| 7,971,720 B2 | 7/2011 | Minkler |
| 8,118,177 B2 | 2/2012 | Drapela et al. |
| 8,343,024 B1 * | 1/2013 | Costanzo, Jr. ......... B65D 5/241 493/128 |
| 8,365,943 B2 | 2/2013 | Bentley |
| 8,465,404 B2 | 6/2013 | Hadley |
| 8,579,183 B2 | 11/2013 | Belfort et al. |
| 8,596,520 B2 | 12/2013 | Scott |
| 8,613,202 B2 | 12/2013 | Williams |
| 8,651,593 B2 | 2/2014 | Bezich et al. |
| 8,763,811 B2 | 7/2014 | Lantz |
| 8,763,886 B2 | 7/2014 | Hall |
| 8,795,470 B2 | 8/2014 | Henderson et al. |
| 8,919,082 B1 | 12/2014 | Cataldo |
| 8,960,528 B2 | 2/2015 | Sadlier |
| 9,272,475 B2 | 3/2016 | Ranade et al. |
| 9,290,313 B2 | 3/2016 | De Lesseux et al. |
| 9,322,136 B2 | 4/2016 | Ostendorf et al. |
| D758,182 S | 6/2016 | Sponselee |
| 9,408,445 B2 | 8/2016 | Mogil et al. |
| 9,429,350 B2 | 8/2016 | Chapman, Jr. |
| 9,499,294 B1 * | 11/2016 | Costanzo, Jr. ....... B65D 5/4608 |
| 9,550,618 B1 | 1/2017 | Jobe |
| 9,605,382 B2 | 3/2017 | Virtanen |
| 9,611,067 B2 | 4/2017 | Collison |
| 9,635,916 B2 | 5/2017 | Bezich et al. |
| 9,701,437 B2 | 7/2017 | Bugas et al. |
| 9,738,420 B2 | 8/2017 | Miller |
| 9,738,432 B1 | 8/2017 | Petrucci et al. |
| 9,834,366 B2 | 12/2017 | Giuliani |
| 9,908,680 B2 | 3/2018 | Shi et al. |
| 9,908,684 B2 | 3/2018 | Collison |
| 9,920,517 B2 | 3/2018 | Sollie et al. |
| 9,950,830 B2 | 4/2018 | De Lesseux et al. |
| 9,981,797 B2 | 5/2018 | Aksan et al. |
| 10,046,901 B1 | 8/2018 | Jobe |
| 10,094,126 B2 | 10/2018 | Collison et al. |
| 10,112,756 B2 | 10/2018 | Menzel, Jr. |
| 10,226,909 B2 | 3/2019 | Frem et al. |
| 10,266,332 B2 | 4/2019 | Aksan et al. |
| 10,357,936 B1 | 7/2019 | Vincent et al. |
| 10,442,600 B2 | 10/2019 | Waltermire et al. |
| 10,507,968 B2 | 12/2019 | Sollie et al. |
| 10,551,110 B2 | 2/2020 | Waltermire et al. |
| 10,583,977 B2 | 3/2020 | Collison et al. |
| 10,800,595 B2 | 10/2020 | Waltermire et al. |
| 2001/0010312 A1 | 8/2001 | Mogil |
| 2002/0020188 A1 | 2/2002 | Sharon et al. |
| 2002/0162767 A1 | 11/2002 | Ohtsubo |
| 2003/0145561 A1 | 8/2003 | Cals et al. |
| 2004/0004111 A1 | 1/2004 | Cardinale |
| 2004/0031842 A1 | 2/2004 | Westerman et al. |
| 2004/0079794 A1 | 4/2004 | Mayer |
| 2005/0109655 A1 | 5/2005 | Vershum et al. |
| 2005/0189404 A1 | 9/2005 | Xiaohai et al. |
| 2005/0214512 A1 | 9/2005 | Fascio |
| 2005/0224501 A1 | 10/2005 | Folkert et al. |
| 2005/0279963 A1 | 12/2005 | Church et al. |
| 2006/0053828 A1 | 3/2006 | Shallman et al. |
| 2006/0078720 A1 | 4/2006 | Toas et al. |
| 2006/0096978 A1 | 5/2006 | Lafferty et al. |
| 2006/0193541 A1 | 8/2006 | Norcom |
| 2007/0000932 A1 | 1/2007 | Cron et al. |
| 2007/0000983 A1 | 1/2007 | Spurrell et al. |
| 2007/0051782 A1 | 3/2007 | Lantz |
| 2007/0193298 A1 | 8/2007 | Derifield |
| 2007/0209307 A1 | 9/2007 | Andersen |
| 2007/0257040 A1 | 11/2007 | Price, Jr. et al. |
| 2008/0095959 A1 | 4/2008 | Warner et al. |
| 2008/0135564 A1 | 6/2008 | Romero |
| 2008/0173703 A1 | 7/2008 | Westerman et al. |
| 2008/0190940 A1 | 8/2008 | Scott |
| 2008/0203090 A1 | 8/2008 | Dickinson |
| 2008/0289302 A1 | 11/2008 | Vulpitta |
| 2008/0296356 A1 | 12/2008 | Hatcher et al. |
| 2008/0308616 A1 | 12/2008 | Phung |
| 2008/0314794 A1 | 12/2008 | Bowman |
| 2009/0034883 A1 | 2/2009 | Giuliani |
| 2009/0114311 A1 | 5/2009 | McDowell |
| 2009/0193765 A1 | 8/2009 | Lantz |
| 2009/0214142 A1 | 8/2009 | Bossel et al. |
| 2009/0283578 A1 | 11/2009 | Miller |
| 2009/0288791 A1 | 11/2009 | Hammer et al. |
| 2010/0001056 A1 | 1/2010 | Chandaria |
| 2010/0006630 A1 | 1/2010 | Humphries et al. |
| 2010/0062921 A1 | 3/2010 | Veiseh |
| 2010/0072105 A1 | 3/2010 | Glaser et al. |
| 2010/0139878 A1 | 6/2010 | Clemente |
| 2010/0151164 A1 | 6/2010 | Grant et al. |
| 2010/0258574 A1 | 10/2010 | Bentley |
| 2010/0282827 A1 | 11/2010 | Padovani |
| 2010/0284634 A1 | 11/2010 | Hadley |
| 2010/0314397 A1 | 12/2010 | Williams et al. |
| 2010/0314437 A1 | 12/2010 | Dowd |
| 2011/0042449 A1 | 2/2011 | Copenhaver et al. |
| 2011/0100868 A1 | 5/2011 | Lantz |
| 2011/0114513 A1 | 5/2011 | Miller |
| 2011/0235950 A1 | 9/2011 | Lin |
| 2011/0284556 A1 | 11/2011 | Palmer et al. |
| 2011/0311758 A1 | 12/2011 | Burns et al. |
| 2011/0317944 A1 | 12/2011 | Liu |
| 2012/0031957 A1 | 2/2012 | Whitaker |
| 2012/0074823 A1 | 3/2012 | Bezich et al. |
| 2012/0145568 A1 | 6/2012 | Collison et al. |
| 2012/0243808 A1 | 9/2012 | De Lesseux et al. |
| 2012/0248101 A1 | 10/2012 | Tumber et al. |
| 2012/0251818 A1 | 10/2012 | Axrup et al. |
| 2012/0279896 A1 | 11/2012 | Lantz |
| 2013/0112694 A1 | 5/2013 | Bentley |
| 2013/0112695 A1 | 5/2013 | Hall |

(56) References Cited

U.S. PATENT DOCUMENTS

| | | |
|---|---|---|
| 2013/0140317 A1 | 6/2013 | Roskoss |
| 2014/0000306 A1 | 1/2014 | Chapman, Jr. |
| 2014/0021208 A1 | 1/2014 | Anti et al. |
| 2014/0093697 A1 | 4/2014 | Perry et al. |
| 2014/0248003 A1 | 9/2014 | Mogil et al. |
| 2014/0319018 A1 | 10/2014 | Collison |
| 2014/0367393 A1 | 12/2014 | Ranade |
| 2015/0110423 A1 | 4/2015 | Fox et al. |
| 2015/0166244 A1 | 6/2015 | Wood et al. |
| 2015/0175338 A1 | 6/2015 | Culp et al. |
| 2015/0238033 A1 | 8/2015 | Zavitsanos |
| 2015/0239639 A1 | 8/2015 | Wenner et al. |
| 2015/0259126 A1 | 9/2015 | McGoff et al. |
| 2015/0284131 A1* | 10/2015 | Genender ............. B65D 5/443 229/117.06 |
| 2015/0345853 A1 | 12/2015 | Oeyen |
| 2016/0015039 A1 | 1/2016 | Pierce |
| 2016/0052696 A1 | 2/2016 | Cook et al. |
| 2016/0060017 A1 | 3/2016 | De Lesseux et al. |
| 2016/0304267 A1 | 10/2016 | Aksan |
| 2016/0325915 A1 | 11/2016 | Aksan |
| 2017/0015080 A1 | 1/2017 | Collison et al. |
| 2017/0043937 A1 | 2/2017 | Lantz |
| 2017/0198959 A1 | 7/2017 | Morris |
| 2017/0225870 A1 | 8/2017 | Collison |
| 2017/0233134 A9 | 8/2017 | Grajales et al. |
| 2017/0283157 A1 | 10/2017 | Jobe |
| 2017/0305639 A1 | 10/2017 | Kuhn et al. |
| 2017/0320653 A1 | 11/2017 | Mogil et al. |
| 2017/0334622 A1 | 11/2017 | Menzel, Jr. |
| 2017/0341847 A1 | 11/2017 | Chase et al. |
| 2017/0369226 A1 | 12/2017 | Chase et al. |
| 2018/0050857 A1 | 2/2018 | Collison |
| 2018/0051460 A1 | 2/2018 | Sollie et al. |
| 2018/0148246 A1 | 5/2018 | Fu et al. |
| 2018/0194534 A1 | 7/2018 | Jobe |
| 2018/0215525 A1 | 8/2018 | Vogel et al. |
| 2018/0229917 A1 | 8/2018 | Jobe |
| 2018/0237207 A1 | 8/2018 | Aksan et al. |
| 2018/0274837 A1 | 9/2018 | Christensen |
| 2018/0290813 A1 | 10/2018 | Waltermire et al. |
| 2018/0290815 A1 | 10/2018 | Waltermire et al. |
| 2018/0299059 A1 | 10/2018 | McGoff et al. |
| 2018/0327171 A1 | 11/2018 | Waltermire et al. |
| 2018/0327172 A1 | 11/2018 | Waltermire et al. |
| 2018/0334308 A1 | 11/2018 | Moore et al. |
| 2018/0335241 A1 | 11/2018 | Li et al. |
| 2019/0032991 A1 | 1/2019 | Waltermire et al. |
| 2019/0047775 A1 | 2/2019 | Waltermire et al. |
| 2019/0185246 A1 | 6/2019 | Sollie et al. |
| 2019/0185247 A1 | 6/2019 | Sollie et al. |
| 2019/0193916 A1 | 6/2019 | Waltermire et al. |
| 2019/0210790 A1 | 7/2019 | Rizzo et al. |
| 2019/0234679 A1 | 8/2019 | Waltermire et al. |
| 2019/0248573 A1 | 8/2019 | Collison et al. |
| 2019/0270572 A1 | 9/2019 | Collison et al. |
| 2019/0270573 A1 | 9/2019 | Collison et al. |
| 2019/0352075 A1 | 11/2019 | Waltermire et al. |
| 2019/0352076 A1 | 11/2019 | Waltermire et al. |
| 2019/0352080 A1 | 11/2019 | Waltermire et al. |
| 2019/0359412 A1 | 11/2019 | Sollie et al. |
| 2019/0359413 A1 | 11/2019 | Sollie et al. |
| 2019/0359414 A1 | 11/2019 | Sollie et al. |
| 2019/0367209 A1 | 12/2019 | Jobe |
| 2019/0376636 A1 | 12/2019 | Fellinger et al. |
| 2019/0390892 A1 | 12/2019 | Waltermire et al. |
| 2020/0088458 A1 | 3/2020 | Waltermire et al. |
| 2020/0103159 A1 | 4/2020 | Waltermire et al. |
| 2020/0122896 A1 | 4/2020 | Waltermire et al. |
| 2020/0148409 A1 | 5/2020 | Sollie et al. |
| 2020/0148410 A1 | 5/2020 | Sollie et al. |
| 2020/0148453 A1 | 5/2020 | Sollie et al. |
| 2020/0283188 A1 | 9/2020 | Sollie et al. |
| 2020/0346816 A1 | 11/2020 | Sollie et al. |
| 2020/0346841 A1 | 11/2020 | Sollie et al. |

FOREIGN PATENT DOCUMENTS

| | | |
|---|---|---|
| CN | 108001787 | 5/2018 |
| DE | 1897846 | 7/1964 |
| DE | 102011016500 | 10/2012 |
| DE | 202017103230 | 7/2017 |
| DE | 202017003908 | 10/2017 |
| EP | 0133539 | 2/1985 |
| EP | 0537058 | 4/1993 |
| EP | 2990196 | 3/2016 |
| FR | 1241878 | 9/1960 |
| FR | 2705317 | 11/1994 |
| FR | 2820718 | 8/2002 |
| FR | 2821786 | 9/2002 |
| FR | 3016352 | 7/2015 |
| GB | 217683 | 6/1924 |
| GB | 235673 | 6/1925 |
| GB | 528289 | 1/1940 |
| GB | 713640 | 8/1954 |
| GB | 1204058 | 9/1970 |
| GB | 1305212 | 1/1973 |
| GB | 1372054 | 10/1974 |
| GB | 2400096 | 5/2006 |
| GB | 2516490 | 1/2015 |
| JP | 01254557 | 10/1989 |
| JP | 2005139582 | 6/2005 |
| JP | 2005247329 | 9/2005 |
| JP | 2012126440 | 7/2012 |
| WO | 8807476 | 10/1988 |
| WO | 9726192 | 7/1997 |
| WO | 9932374 | 7/1999 |
| WO | 2001070592 | 9/2001 |
| WO | 2014147425 | 9/2014 |
| WO | 2016187435 A2 | 5/2016 |
| WO | 2016187435 A3 | 11/2016 |
| WO | 2018089365 | 5/2018 |
| WO | 2018093586 | 5/2018 |
| WO | 2018227047 | 12/2018 |
| WO | 2019125904 | 6/2019 |
| WO | 2019125906 | 6/2019 |
| WO | 2019226199 | 11/2019 |
| WO | 2020101939 | 5/2020 |
| WO | 2020102023 | 5/2020 |
| WO | 2020122921 | 6/2020 |
| WO | 2020222943 | 11/2020 |

OTHER PUBLICATIONS

Waltermire, Jamie; Non-Final Office Action for U.S. Appl. No. 15/482,186, filed Apr. 7, 2017, dated Aug. 20, 2019, 81 pgs.
Waltermire, Jamie; Requirement for Restriction/Election for U.S. Appl. No. 15/482,186, filed Apr. 7, 2017, dated Apr. 17, 2019, 7 pgs.
Waltermire, Jamie; Final Office Action for U.S. Appl. No. 15/482,200, filed Apr. 7, 2017, dated Jan. 2, 2019, 23 pgs.
Waltermire, Jamie; Non-Final Office Action for U.S. Appl. No. 15/482,200, filed Apr. 7, 2017, dated Jun. 11, 2018, 36 pgs.
Waltermire, Jamie; Notice of Allowance for U.S. Appl. No. 15/482,200, filed Apr. 7, 2017, dated May 14, 2019, 25 pgs.
Waltermire, Jamie; Supplemental Notice of Allowance for U.S. Appl. No. 15/482,200, filed Apr. 7, 2017, dated Jul. 26, 2019, 9 pgs.
Waltermire, Jamie; Supplemental Notice of Allowance for U.S. Appl. No. 15/482,200, filed Apr. 7, 2017, dated Aug. 12, 2019, 7 pgs.
Waltermire, Jamie; Supplemental Notice of Allowance for U.S. Appl. No. 15/482,200, filed Apr. 7, 2017, dated Sep. 10, 2019, 8 pgs.
Waltermire, Jamie; Final Office Action for U.S. Appl. No. 15/590,345, filed May 9, 2017, dated Mar. 19, 2019, 42 pgs.
Waltermire, Jamie; Non-Final Office Action for U.S. Appl. No. 15/590,345, filed May 9, 2017, dated Aug. 24, 2018, 41 pgs.
Waltermire, Jamie; Notice of Allowance for U.S. Appl. No. 15/590,345, filed May 9, 2017, dated Oct. 1, 2019, 28 pgs.
Waltermire, Jamie; Final Office Action for U.S. Appl. No. 15/590,349, filed May 9, 2017, dated May 9, 2019, 31 pgs.
Waltermire, Jamie; Non-Final Office Action for U.S. Appl. No. 15/590,349, filed May 9, 2017, dated Nov. 5, 2018, 41 pgs.

(56) References Cited

OTHER PUBLICATIONS

Waltermire, Jamie; Non-Final Office Action for U.S. Appl. No. 15/590,349, filed May 9, 2017, dated Sep. 5, 2019, 25 pgs.
Waltermire, Jamie; Requirement for Restriction/Election for U.S. Appl. No. 15/590,349, filed May 9, 2017, dated Aug. 30, 2018, 10 pgs.
Waltermire, Jamie; Final Office Action for U.S. Appl. No. 15/663,905, filed Jul. 31, 2017, dated Aug. 22, 2019, 23 pgs.
Waltermire, Jamie; Non-Final Office Action for U.S. Appl. No. 15/663,905, filed Jul. 31, 2017, dated Jun. 25, 2019, 66 pgs.
Waltermire, Jamie; Notice of Allowance for U.S. Appl. No. 15/663,905, filed Jul. 31, 2017, dated Nov. 4, 2019, 18 pgs.
Waltermire, Jamie; Requirement for Restriction/Election for U.S. Appl. No. 15/663,905, filed Jul. 31, 2017, mailed Mar. 21, 2019, 8 pgs.
Waltermire, Jamie; Non-Final Office Action for U.S. Appl. No. 16/381,678, filed Apr. 11, 2019, dated Sep. 9, 2019, 50 pgs.
Sollie, Greg; Corrected Notice of Allowance for U.S. Appl. No. 15/845,545, filed Dec. 18, 2017, dated Oct. 1, 2019, 7 pgs.
Sollie, Greg; Corrected Notice of Allowance for U.S. Appl. No. 15/845,545, filed Dec. 18, 2017, dated Oct. 31, 2019, 12 pgs.
Sollie, Greg; Non-Final Office Action for U.S. Appl. No. 15/845,545, filed Dec. 18, 2017, dated Mar. 5, 2019, 41 pgs.
Sollie, Greg; Notice of Allowance for U.S. Appl. No. 15/845,545, filed Dec. 18, 2017, dated Jun. 19, 2019, 20 pgs.
Sollie, Greg; Final Office Action for U.S. Appl. No. 15/845,540, filed Dec. 18, 2017, dated Oct. 30, 2019, 56 pgs.
Sollie, Greg; Non-Final Office Action for U.S. Appl. No. 15/845,540, filed Dec. 18, 2017, dated Apr. 2, 2019, 50 pgs.
"Green Cell Foam Shipping Coolers", located at <https://www.greencellfoam.com/shipping-coolers>, accessed on Oct. 18, 2019, 4 pgs.
Collison, Alan B.; Applicant Interview Summary for U.S. Appl. No. 15/677,738, filed Aug. 15, 2017, dated Dec. 5, 2018, 4 pgs.
Collison, Alan B.; Applicant Interview Summary for U.S. Appl. No. 15/677,738, filed Aug. 15, 2017, dated Apr. 22, 2019, 4 pgs.
Collison, Alan B.; Corrected Notice of Allowance for U.S. Appl. No. 15/677,738, filed Aug. 15, 2017, dated Jul. 15, 2019, 7 pgs.
Collison, Alan B.; Final Office ACtion for U.S. Appl. No. 15/677,738, filed Aug. 15, 2017, dated Feb. 28, 2019, 14 pgs.
Collison, Alan B.; Non-Final Office Action for U.S. Appl. No. 15/677,738, filed Aug. 15, 2017, dated Oct. 23, 2018, 11 pgs.
Collison, Alan B.; Notice of Allowance for U.S. Appl. No. 15/677,738, filed Aug. 15, 2017, dated Oct. 29, 2019, 14 pgs.
Collison, Alan B.; Notice of Allowance for U.S. Appl. No. 15/677,738, filed Aug. 15, 2017, dated Jun. 19, 2019, 10 pgs.
Collison, Alan B.; Requirement for Restriction/Election for U.S. Appl. No. 15/677,738, filed Aug. 15, 2017, dated Jul. 3, 2018, 8 pgs.
Collison, Alan B.; Requirement for Restriction/Election for U.S. Appl. No. 15/677,738, filed Aug. 15, 2017, dated Jul. 31, 2018, 8 pgs.
CooLiner® Insulated Shipping Bags, available at <http://www/chem-tran.com/packaging/supplies/cooliner-insulated-shipping-bags.php>, accessed on Oct. 18, 2019, 4 pgs.
Sollie, Greg; Final Office Action for U.S. Appl. No. 15/988,550, filed May 24, 2018, dated Aug. 14, 2019, 19 pgs.
Sollie, Greg; Non-Final Office Action for U.S. Appl. No. 15/988,550, filed May 24, 2018, dated Oct. 9, 2019, 17 pgs.
Sollie, Greg; Non-Final Office Action for U.S. Appl. No. 15/988,550, filed May 24, 2018, dated May 29, 2019, 48 pgs.
Sollie, Greg; Final Office Action for U.S. Appl. No. 16/280,595, filed Feb. 20, 2019, dated Oct. 3, 2019, 19 pgs.
Sollie, Greg; Non-Final Office Action for U.S. Appl. No. 16/280,595, filed Feb. 20, 2019, dated May 29, 2019, 60 pgs.
Sollie, Greg; Non-Final Office Action for U.S. Appl. No. 16/530,052, filed Aug. 2, 2019, dated Oct. 2, 2019, 12 pgs.
Cellulose Material Solutions, LLC; Brochure for Infinity Care Thermal Liner, accessed on Oct. 22, 2018, 2 pgs.
Uline; Article entitled: Corrugated Corner Protectors—4 x 4", accessed on Oct. 25, 2018, 1 pg.
DHL Express; Brochure for Dry Ice Shipping Guidelines, accessed on Oct. 26, 2018, 12 pgs.
Sollie, Greg; Non-Final Office Action for U.S. Appl. No. 16/382,710, filed Apr. 12, 2019, dated Oct. 10, 2019, 49 pgs.
Sollie, Greg; Requirement for Restriction/Election for U.S. Appl. No. 16/382,710, filed Apr. 12, 2019, dated Jul. 15, 2019, 6 pgs.
Thomas Scientific; Article entitled: "Thermosafe: Test Tube Shipper/Rack", accessed on Oct. 26, 2018, 2 pgs.
Stinson, Elizabeth; Article entitled: "A Pizza Geek Discovers the World's Smartest Pizza Box", published Jan. 17, 2014, 8 pgs.
Singh, et al; Article entitled: "Performance Comparison of Thermal Insulated Packaging Boxes, Bags and Refrigerants for Single-parcel Shipments", published Mar. 13, 2007, 19 pgs.
Periwrap; Article entitled: "Insulated Solutions", located at <https://www.peri-wrap.com/insulation/>, accessed on Dec. 3, 2018, 9 pgs.
UN Packaging; Article entitled: "CooLiner® Insulated Shipping Bags", available at <http://www.chem-tran.com/packaging/supplies/cooliner-insulated-shipping-bags.php>, accessed on Aug. 30, 2017, 2 pgs.
Greenblue; "Environmental Technical Briefs of Common Packaging Materials—Fiber-Based Materials", Sustainable Packaging Solution, 2009.
MP Global Products; Article entitled: "Thermopod mailer envelopes and Thermokeeper insulated box liners", located at < http://www.mhpn.com/product/thermopod_mailer_envelopes_and_thermokeeper_insulated_box_liners/packaging>, accessed on Aug. 30, 2017, 2 pgs.
Images of Novolex bag, including an outer paper bag, a corrugated cardboard insert, and an inner foil-covered bubble-wrap bag, publicly available prior to May 9, 2017, 7 pgs.
Duro Bag; Article entitled: "The Load and Fold Bag", accessed on May 24, 2017, copyrighted Apr. 2017, 3 pgs.
TERA-PAK; Article entitled: "Insulated Shipping Containers", located at <http://www.tera-pak.com/>, accessed on Mar. 20, 2017, 3 pgs.
American Bag Company; Article entitled: "Cool Green Bag, Small", located at <http://hotcoldbags.com/items/Cool%20Green%20Bag,%20Small>, accessed on Mar. 20, 2017, 2 pgs.
weiku.com; Article entitled: "100% Biodegradable Packing materials Green Cell Foam Stock Coolers", located at <http://www.weiku.com/products/18248504/100_Biodegradable_Packing_materials_Green_Cell_Foam_Stock_Coolers.html>, accessed on Sep. 28, 2017, 7 pgs.
Salazar Packaging; Article entitle: "Custom Packaging and Design", located at <https://salazarpackaging.com/custom-packaging-and-design/>, accessed on Sep. 28, 2017, 2 pgs.
Voluntary Standard for Repulping and Recycling Corrugated Fiberboard Treated to Improve Its Performance in the Presence of Water and Water Vapor. (revises Aug. 16, 2013) Fibre Box Association (FBA), Elk Grove Village, IL, 1-23, Retrieved from http://www.corrugated.org/wp-content/uploads/PDFs/Recycling/Vol_Std_Protocol_2013. pdf.
MP Global Products, LLC; International Search Report and Written Opinion of the International Searching Authority for PCT/US2017/060403, filed Nov. 7, 2017, dated Feb. 19, 2018, 15 pgs.
Cold Keepers; Article entitled: "Insulated Shipping Boxes—Coldkeepers, Thermal Shipping Solutions", located at <https://www.coldkeepers.com/product-category/shipping/>, (Accessed: Jan. 12, 2017), 3 pgs.
Needles 'N' Knowledge; Article entitled: "Tall Box With Lid", located at <http://needlesnknowledge.blogspot.com/2017/10/tall-box-with-lid.html> (Accessed: Jan. 12, 2017), 10 pgs.
Sollie, Greg; Non-Final Office Action for U.S. Appl. No. 16/408,981, filed May 10, 2019, dated Aug. 20, 2019, 50 pgs.
Waltermire, Jamie; International Search Report and Written Opinion for PCT Application No. PCT/US18/65464, filed Dec. 13, 2018, dated Mar. 11, 2019, 9 pgs.
Sollie, Greg; International Search Report and Written Opinion for PCT Application No. PCT/US18/65459, filed Dec. 13, 2018, dated May 1, 2019, 15 pgs.
Sollie, Greg; International Search Report and Written Opinion for PCT Application No. PCT/US18/65461, filed Dec. 13, 2018, dated Mar. 21, 2019, 13 pgs.
Sollie, Greg; International Search Report and Written Opinion for PCT/US18/65463, filed Dec. 13, 2018, dated Mar. 25, 2019, 11 pgs.

(56) References Cited

OTHER PUBLICATIONS

Waltermire, Jamie; Notice of Allowance for U.S. Appl. No. 15/482,186, filed Apr. 7, 2017, dated Mar. 5, 2020, 29 pgs.
Waltermire, Jamie; Corrected Notice of Allowance for U.S. Appl. No. 15/590,345, filed May 9, 2017, dated Feb. 18, 2020, 9 pgs.
Waltermire, Jamie; Requirement for Restriction/Election for U.S. Appl. No. 16/293,716, filed Mar. 6, 2019, dated Feb. 26, 2020, 6 pgs.
Waltermire, Jamie; Non-Final Office Action for U.S. Appl. No. 16/526,555, filed Jul. 30, 2019, dated Apr. 2, 2020, 63 pgs.
Waltermire, Jamie; Advisory Action for U.S. Appl. No. 16/381,678, filed Apr. 11, 2019, dated Feb. 26, 2020, 3 pgs.
Waltermire, Jamie; Non-Final Office Action for U.S. Appl. No. 16/381,678, filed Apr. 11, 2019, dated Apr. 17, 2020, 30 pgs.
Waltermire, Jamie; Requirement for Restriction/Election for U.S. Appl. No. 16/561,203, filed Sep. 5, 2019, dated Feb. 26, 2020, 5 pgs.
Sollie, Greg; Non-Final Office Action for U.S. Appl. No. 15/845,540, filed Dec. 18, 2017, dated Feb. 19, 2020, 32 pgs.
Sollie, Greg; Non-Final Office Action for U.S. Appl. No. 15/988,550, filed May 24, 2018, dated Mar. 11, 2020, 35 pgs.
Sollie, Greg; Final Office Action for U.S. Appl. No. 16/280,595, filed Feb. 20, 2019, dated Mar. 24, 2020, 20 pgs.
Sollie, Greg; Applicant-Initiated Interview Summary for U.S. Appl. No. 16/530,052, filed Aug. 2, 2019, dated Feb. 5, 2020, 2 pgs.
Sollie, Greg; Non-Final Office Action for U.S. Appl. No. 16/530,052, filed Aug. 2, 2019, dated Mar. 3, 2020, 24 pgs.
Sollie, Greg; Non-Final Office Action for U.S. Appl. No. 16/401,603, filed May 2, 2019, dated Mar. 10, 2020, 67 pgs.
Sollie, Greg; Requirement for Restriction/Election for U.S. Appl. No. 16/401,603, filed May 2, 2019, dated Feb. 18, 2020, 6 pgs.
Sollie, Greg; Final Office Action for U.S. Appl. No. 16/382,710, filed Apr. 12, 2019, dated Apr. 6, 2020, 33 pgs.
Sollie, Greg; Final Office Action for U.S. Appl. No. 16/408,981, filed May 10, 2019, dated Feb. 24, 2020, 29 pgs.
Waltermire, Jamie; Non-Final Office Action for U.S. Appl. No. 16/526,511, filed Jul. 30, 2019, dated Dec. 9, 2019, 55 pgs.
Waltermire, Jamie; Non-Final Office Action for U.S. Appl. No. 16/530,045, filed Aug. 2, 2019, dated Dec. 20, 2019, 61 pgs.
Waltermire, Jamie; Supplemental Notice of Allowance for U.S. Appl. No. 15/590,345, filed May 9, 2017, dated Jan. 9, 2020, 8 pgs.
Waltermire, Jamie; Supplemental Notice of Allowance for U.S. Appl. No. 15/590,345, filed May 9, 2017, dated Dec. 3, 2019, 14 pgs.
Waltermire, Jamie; Applicant-Initiated Interview Summary for U.S. Appl. No. 15/590,349, filed May 9, 2017, dated Dec. 3, 2019, 3 pgs.
Waltermire, Jamie; Final Office Action for U.S. Appl. No. 15/590,349, filed May 9, 2017, dated Jan. 6, 2020, 26 pgs.
Waltermire, Jamie; Requirement for Restriction/Election for U.S. Appl. No. 16/526,555, filed Jul. 30, 2019, dated Jan. 17, 2020, 7 pgs.
Waltermire, Jamie; Corrected Notice of Allowance for U.S. Appl. No. 15/663,905, filed Jul. 31, 2017, dated Nov. 18, 2019, 6 pgs.
Waltermire, Jamie; Corrected Notice of Allowance for U.S. Appl. No. 15/663,905, filed Jul. 31, 2017, dated Dec. 26, 2019, 7 pgs.
Waltermire, Jamie; Final Office Action for U.S. Appl. No. 16/381,678, filed Apr. 11, 2019, dated Dec. 30, 2019, 17 pgs.
Collison, Alan B.; Supplemental Notice of Allowance for U.S. Appl. No. 15/677,738, filed Aug. 15, 2017, dated Dec. 10, 2019, 4 pgs.
Sollie, Greg; Applicant Initiated Interview Summary for U.S. Appl. No. 15/988,550, filed May 24, 2018, dated Dec. 27, 2019, 3 pgs.
Sollie, Greg; Non-Final Office Action for U.S. Appl. No. 16/280,595, filed Feb. 20, 2019, dated Dec. 19, 2019, 23 pgs.
Sollie, Greg; Final Office Action for U.S. Appl. No. 16/530,052, filed Aug. 2, 2019, dated Dec. 27, 2019, 49 pgs.
Sollie, Greg; Non-Final Office Action for U.S. Appl. No. 16/567,192, filed Sep. 11, 2019, dated Dec. 10, 2019, 49 pgs.
Sollie, Greg; International Search Report and Written Opinion for PCT Application No. PCT/US19/60486, filed Nov. 18, 2019, dated Jan. 13, 2020, 10 pgs.
Sollie, Greg; Invitation to Pay Additional Fees for PCT/US19/59764, filed Nov. 5, 2019, dated Jan. 2, 2020, 2 pgs.
Waltermire, Jamie; Corrected Notice of Allowance for U.S. Appl. No. 15/482,186, filed Apr. 7, 2017, dated Jun. 2, 2020, 10 pgs.
Waltermire, Jamie; Applicant-Initiated Interview Summary for U.S. Appl. No. 16/526,511, filed Jul. 30, 2019, dated Jun. 12, 2020, 5 pgs.
Waltermire, Jamie; Final Office Action for U.S. Appl. No. 16/526,511, filed Jul. 30, 2019, dated May 19, 2020, 39 pgs.
Waltermire, Jamie; Non-Final Office Action for U.S. Appl. No. 16/526,511, filed Jul. 30, 2019, dated Jul. 10, 2020, 23 pgs.
Waltermire, Jamie; Applicant-Initiated Interview Summary for U.S. Appl. No. 16/530,045, filed Aug. 2, 2019, dated Jun. 15, 2020, 3 pgs.
Waltermire, Jamie; Non-Final Office Action for U.S. Appl. No. 16/530,045, filed Aug. 2, 2019, dated Jun. 27, 2020, 38 pgs.
Waltermire, Jamie; Non-Final Office Action for U.S. Appl. No. 15/590,349, filed May 9, 2017, dated Jun. 12, 2020, 30 pgs.
Waltermire, Jamie; Non-Final Office Action for U.S. Appl. No. 16/293,716, filed Mar. 6, 2019, dated May 5, 2020, 70 pgs.
Waltermire, Jamie; Final Office Action for U.S. Appl. No. 16/381,678, filed Apr. 11, 2019, dated Jun. 16, 2020, 8 pgs.
Waltermire, Jamie; Non-Final Office Action for U.S. Appl. No. 16/561,203, filed Sep. 5, 2019, dated May 6, 2020, 59 pgs.
Collison, Alan B.; Applicant Interview Summary for U.S. Appl. No. 16/658,756, filed Oct. 21, 2019, dated May 6, 2020, 3 pgs.
Collison, Alan B.; Applicant Interview Summary for U.S. Appl. No. 16/658,756, filed Oct. 21, 2019, dated Jun. 29, 2020, 3 pgs.
Collison, Alan B.; Final Office Action for U.S. Appl. No. 16/658,756, filed Oct. 21, 2019, dated Jun. 17, 2020, 10 pgs.
Collison, Alan B.; Non-Final Office Action for U.S. Appl. No. 16/658,756, filed Oct. 21, 2019, dated Feb. 4, 2020, 14 pgs.
MP Global Products LLC: European Search Report for serial No. 17868605.1, dated Mar. 16, 2020, 7 pgs.
Collison, Alan B.; Non-Final Office Action for U.S. Appl. No. 16/414,309, filed May 16, 2019, dated Jul. 17, 2020, 77 pgs.
Collison, Alan B.; Requirement for Restriction/Election for U.S. Appl. No. 16/414,309, filed May 16, 2019, dated Jun. 16, 2020, 5 pgs.
Collison, Alan B.; Non-Final Office Action for U.S. Appl. No. 16/414,310, filed May 16, 2019, dated Jul. 8, 2020, 84 pgs.
Sollie, Greg; Advisory Action for U.S. Appl. No. 16/280,595, filed Feb. 20, 2019, dated Jul. 6, 2020, 3 pgs.
Sollie, Greg; Applicant-Initiated Interview Summary for U.S. Appl. No. 16/280,595, filed Feb. 20, 2019 dated May 6, 2020, 3 pgs.
Sollie, Greg; Applicant-Initiated Interview Summary for U.S. Appl. No. 16/401,603, filed May 2, 2019, dated May 15, 2020, 3 pgs.
Sollie, Greg; Final Office Action for U.S. Appl. No. 16/401,603, filed May 2, 2019, dated Jun. 30, 2020, 13 pgs.
Sollie, Greg; Notice of Allowance for U.S. Appl. No. 16/382,710, filed Apr. 12, 2019, dated Jun. 3, 2020, 12 pgs.
Sollie, Greg; Final Office Action for U.S. Appl. No. 16/567,192, filed Sep. 11, 2019, dated Jun. 8, 2020, 20 pgs.
Sollie, Greg; International Preliminary Report on Patentability for PCT Application No. PCT/US18/65459, filed Dec. 13, 2018, dated Jul. 2, 2020, 11 pgs.
Sollie, Greg; International Preliminary Report on Patentability for PCT Application No. PCT/US18/65461, filed Dec. 13, 2018, dated Jul. 2, 2020, 12 pgs.
Sollie, Greg; International Search Report and Written Opinion for PCT Application No. PCT/US20/24820, filed Mar. 26, 2020, dated Jul. 2, 2020, 14 pgs.
Sollie, Greg; International Search Report and Written Opinion for PCT Application No. PCT/US19/59764, filed Nov. 5, 2019, dated Jul. 1, 2020, 13 pgs.
Waltermire, Jamie; Corrected Notice of Allowance for U.S. Appl. No. 15/482,186, filed Apr. 7, 2017, dated Sep. 2, 2020, 12 pgs.
Waltermire, Jamie; Notice of Allowance for U.S. Appl. No. 16/526,511, filed Jul. 30, 2019, dated Sep. 14, 2020, 18 pgs.
Waltermire, Jamie; Final Office Action for U.S. Appl. No. 16/293,716, filed Mar. 6, 2019, dated Sep. 10, 2020, 24 pgs.
Waltermire, Jamie; Final Office Action for U.S. Appl. No. 16/381,678, filed Apr. 11, 2019, dated Aug. 20, 2020, 21 pgs.
Waltermire, Jamie; Notice of Allowance for U.S. Appl. No. 16/381,678, filed Apr. 11, 2019, dated Jul. 30, 2020, 15 pgs.

(56) References Cited

OTHER PUBLICATIONS

Waltermire, Jamie; Final Office Action for U.S. Appl. No. 16/561,203, filed Sep. 5, 2019, dated Sep. 10, 2020, 25 pgs.
Waltermire, Jamie; Requirement for Restriction/Election for U.S. Appl. No. 16/689,433, filed Nov. 20, 2019, dated Oct. 16, 2020, 6 pgs.
Sollie, Greg; Final Office Action for U.S. Appl. No. 15/845,540, filed Dec. 18, 2017, dated Sep. 2, 2020, 28 pgs.
Sollie, Greg; Notice of Allowance for U.S. Appl. No. 15/845,540, filed Dec. 18, 2017, dated Sep. 17, 2020, 5 pgs.
Collison, Alan B.; Applicant-Initiated Interview Summary for U.S. Appl. No. 16/414,309, filed May 16, 2019, dated Aug. 21, 2020, 3 pgs.
Collison, Alan B.; Applicant-Initiated Interview Summary for U.S. Appl. No. 16/414/309, filed May 16, 2019, dated Oct. 15, 2020, 3 pgs.
Collison, Alan B.; Final Office Action for U.S. Appl. No. 16/414,309, filed May 16, 2019, dated Oct. 8, 2020, 15 pgs.
Collison, Alan B.; Applicant-Initiated Interview Summary for U.S. Appl. No. 16/414,310, filed May 16, 2019, dated Jul. 30, 2020, 3 pgs.
Collison, Alan; Final Office Action for U.S. Appl. No. 16/414,310, filed May 16, 2019, dated Oct. 13, 2020, 30 pgs.
Sollie, Greg; Final Office Action for U.S. Appl. No. 15/988,550, filed May 24, 2018, dated Aug. 27, 2020, 27 pgs.
Sollie, Greg; Non-Final Office Action for U.S. Application No. 16/280,595, filed Feb. 20, 2019, dated Aug. 28, 2020, 26 pgs.
Sollie, Greg; Final Office Action for U.S. Appl. No. 16/530,052, filed Aug. 2, 2019, dated Aug. 28, 2020, 29 pgs.
Sollie, Greg; Notice of Allowance for U.S. Appl. No. 16/401,603, filed May 2, 2019, dated Aug. 31, 2020, 14 pgs.
Sollie, Greg; Non-Final Office Action for U.S. Appl. No. 16/401,607, filed May 2, 2019, dated Aug. 19, 2020, 88 pgs.
Sollie, Greg; Corrected Notice of Allowance for U.S. Appl. No. 16/382,710, filed Apr. 12, 2019, dated Aug. 24, 2020, 9 pgs.
Sollie, Greg; Notice of Allowance for U.S. Appl. No. 16/567,192, filed Sep. 11, 2019, dated Aug. 7, 2020, 14 pgs.
Sollie, Greg; Non-Final Office Action for U.S. Appl. No. 16/408,981, filed May 10, 2019, dated Sep. 16, 2020, 40 pgs.
MP Global Products LLC: European Search Report Response for serial No. 17868605.1, filed Oct. 2, 2020, 15 pgs.
Waltermire, Jamie; Corrected Notice of Allowance for U.S. Appl. No. 16/526,511, filed Jul. 30, 2019, dated Oct. 30, 2020, 14 pgs.
Waltermire, Jamie; Corrected Notice of Allowance for U.S. Appl. No. 15/590,349, filed May 9, 2017, dated Nov. 2, 2020, 9 pgs.
Waltermire, Jamie; Notice of Allowance for U.S. Appl. No. 15/590,349, filed May 9, 2017, dated Oct. 20, 2020, 20 pgs.
Waltermire, Jamie; Final Office Action for U.S. Appl. No. 16/293,716, filed Mar. 6, 2019, dated Oct. 29, 2020, 19 pgs.
Waltermire, Jamie; Non-Final Office Action for U.S. Application No. 16/526,555, filed Jul. 30, 2019, dated Oct. 27, 2020, 39 pgs.
Waltermire, Jamie; Final Office Action for U.S. Appl. No. 16/381,678, filed Apr. 11, 2019, dated Oct. 19, 2020, 24 pgs.
Waltermire, Jamie; Notice of Allowance for U.S. Appl. No. 16/561,203, filed Sep. 5, 2019, dated Nov. 3, 2020, 14 pgs.
Waltermire, Jamie; Requirement for Restriction/Election for U.S. Appl. No. 16/689,407, filed Nov. 20, 2019, dated Oct. 29, 2020, 6 pgs.
Collison, Alan B.; Advisory Action for U.S. Appl. No. 16/658,756, filed Oct. 21, 2019, dated Sep. 25, 2020, pgs.
Collison, Alan B.; Notice of Allowance for U.S. Appl. No. 16/658,756, filed Oct. 21, 2019, dated Oct. 23, 2020, 10 pgs.
Collison, Alan B.; Notice of Allowance for U.S. Appl. No. 16/414/309, filed May 16, 2019, dated Oct. 21, 2020, 6 pgs.
Sollie, Greg; Corrected Notice of Allowance for U.S. Appl. No. 16/401,603, filed May 2, 2019, dated Nov. 3, 2020, 9 pgs.
Sollie, Greg; Notice of Allowance for U.S. Appl. No. 16/382,710, filed Apr. 12, 2019, dated Oct. 21, 2020, 5 pgs.
Sollie, Greg; Corrected Notice of Allowance for U.S. Appl. No. 16/567,192, filed Sep. 11, 2019, dated Oct. 20, 2020, 8 pgs.
Collison, Alan B.; Notice of Allowance for U.S. Appl. No. 16/414,310, filed May 16, 2019, dated Nov. 13, 2020, 15 pgs.
Collison, Alan B.; Corrected Notice of Allowance for U.S. Appl. No. 16/414,309, filed May 16, 2019, dated Nov. 16, 2020, 10 pgs.

* cited by examiner

MODULAR BOX ASSEMBLY

CROSS-REFERENCE TO RELATED APPLICATIONS

This application is a continuation of U.S. application Ser. No. 15/845,545, filed on Dec. 18, 2017, which is hereby incorporated by reference herein in its entirety.

JOINT RESEARCH AGREEMENT

The subject matter disclosed was developed and the claimed invention was made by, or on behalf of, one or more parties to a joint research agreement between MP Global Products LLC of Norfolk, Nebr. and Pratt Retail Specialties, LLC of Conyers, Ga., that was in effect on or before the effective filing date of the claimed invention, and the claimed invention was made as a result of activities undertaken within the scope of the joint research agreement.

TECHNICAL FIELD

This disclosure relates to packaging. More specifically, this disclosure relates to a modular box assembly.

BACKGROUND

Packaging and shipping temperature sensitive contents can pose challenges. The contents can spoil, destabilize, freeze, melt, or evaporate during storage or shipping if the temperature of the contents is not maintained or the packaging is not protected from hot or cold environmental conditions. Contents such as food, pharmaceuticals, electronics, or other temperature sensitive items can be damaged if exposed to temperature extremes. Many insulated packages are bulky and difficult to store prior to use. Additionally, many insulated packages are specialized to ship or carry hot goods, chilled goods, or frozen goods, and shippers must maintain large stocks of specialized packaging for each application. Additionally, many insulated packages cannot be recycled and are often disposed of in landfills.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a modular box assembly comprising a box having a top end and an opposed bottom end, the box comprising: a first side panel, a third side panel opposed to the first side panel, a second side panel positioned between and coupled to the first side panel and the third side panel, and a fourth side panel opposed to the second side panel, the fourth side panel being positioned between and coupled to the first and third side panels, wherein each of the side panels extends from the top end to the bottom end; a bottom panel disposed at the bottom end of the box, the bottom panel being coupled to each of the side panels such that the side panels and the bottom panel define a box cavity, and the top end defines a box opening in communication with the box cavity; and a first shoulder attached to the second side panel, the first shoulder extending inward from the first side panel and the third side panel into the box cavity; a second shoulder attached to the fourth side panel, the second shoulder extending inward from the first side panel and the third side panel into the box cavity, wherein each shoulder is spaced from the top end a predetermined distance; and a box top comprising a top panel configured to cover the box opening, the box top being selectively movable about and between a closed position, in which the box top encloses the box cavity, and an open position, in which the box top is spaced from the top end and the box cavity is accessible, wherein in the closed position, a lower surface of the top panel engages the first shoulder and the second shoulder to support the top panel, and in the closed position an upper surface of the top panel is substantially flush with the top end of the box.

Also disclosed is a modular box assembly comprising: a box having a top end and an opposed bottom end, the box comprising: a first side panel, a third side panel opposed to the first side panel, a second side panel positioned between and coupled to the first side panel and the third side panel, and a fourth side panel opposed to the second side panel, the fourth side panel being positioned between and coupled to the first and third side panels, wherein each of the side panels extends from the top end to the bottom end; a bottom panel disposed at the bottom end of the box, the bottom panel being coupled to each of the side panels such that the side panels and the bottom panel define a box cavity, and the top end defines a box opening in communication with the box cavity; and a first shoulder attached to the second side panel, the first shoulder extending inward from the first side panel and the third side panel into the box cavity; a second shoulder attached to the fourth side panel, the second shoulder extending inward from the first side panel and the third side panel into the box cavity, wherein each shoulder spaced from the top end a predetermined distance; and a paper handle configured to facilitate carrying of the box, the handle comprising a first end coupled to the second side panel with tape, a second end coupled to the second side panel with tape, and a central portion extending away from the second side panel.

Also disclosed is a modular box assembly comprising: a box having a top end and an opposed bottom end, the box being adjustable about and between an expanded configuration in which the box has an expanded volume, and a collapsed configuration in which the box has a collapsed volume that is less than the expanded volume, the box comprising: a first side panel, a third side panel opposed to the first side panel, a second side panel positioned between and coupled to the first side panel and the third side panel, and a fourth side panel opposed to the second side panel, the fourth side panel being positioned between and coupled to the first and third side panels, wherein each of the side panels extends from the top end to the bottom end; a bottom panel disposed at the bottom end of the box, the bottom panel being coupled to each of the side panels such that the side panels and the bottom panel define a box cavity, and the top end defines a box opening in communication with the box cavity; a box top comprising a top panel and a pair of opposed side tabs extending away from the top panel, the box top configured to cover the box opening in the expanded configuration, the box top being selectively movable about and between a closed position, in which the box top encloses the box cavity, and an open position, in which the box top is spaced from the top end and the box cavity is accessible; and an insulating liner positioned in the box cavity and configured to maintain a desired temperature within the box cavity, wherein in the collapsed and a bundled configuration, the insulating liner is positioned adjacent to the collapsed box and the box top is positioned adjacent to the liner such that the pair of opposed side tabs of the box top wrap around at least a portion of the liner and the collapsed box to contain the liner and the box.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
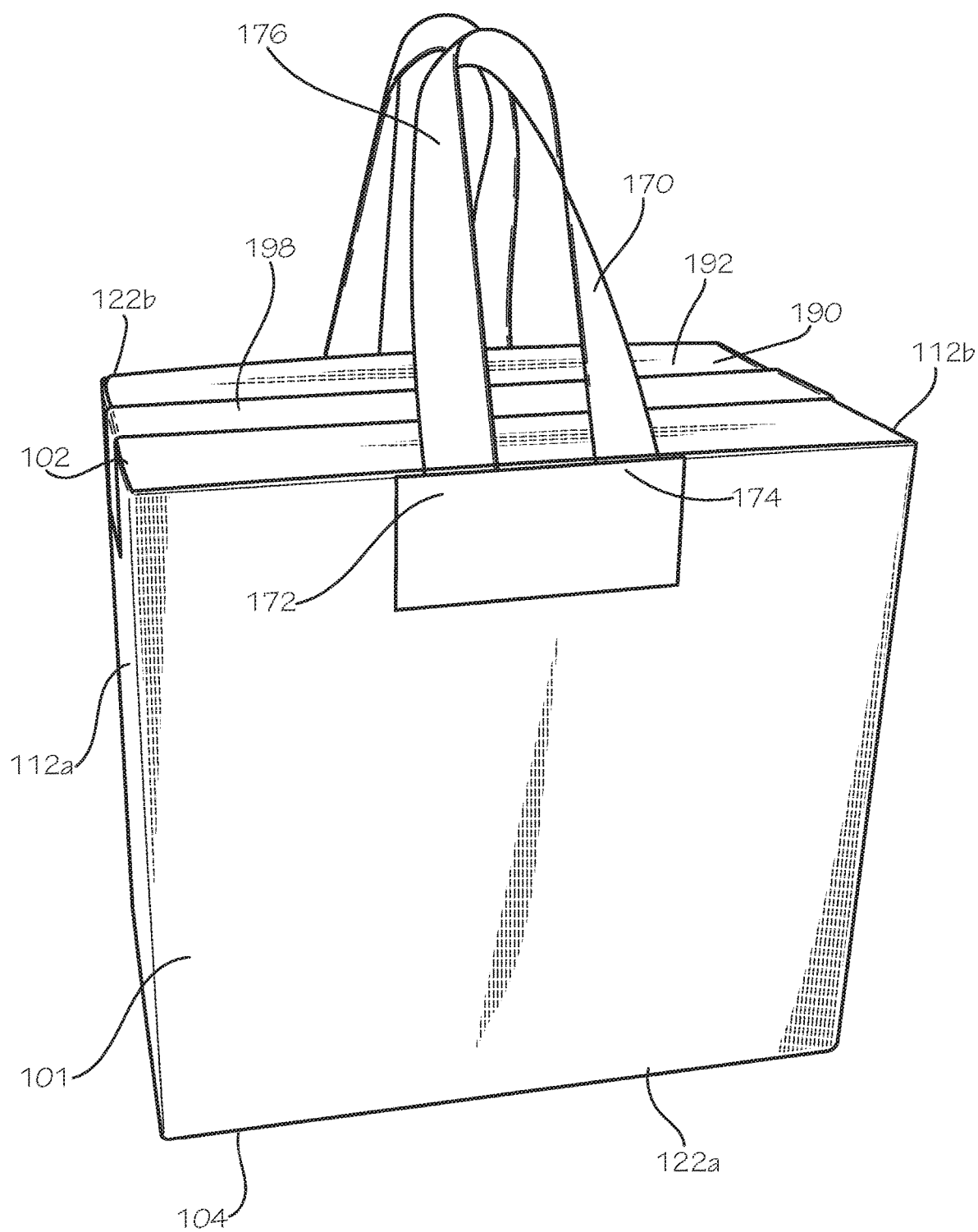
FIG. 1 is a perspective view of a modular box assembly comprising an insulated box, a box top, and a handle in accordance with one aspect of the current disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a modular box assembly and associated methods, systems, devices, and various apparatus. The modular box assembly comprises a box and a box top. It would be understood by one of skill in the art that the disclosed modular box assembly is described in but a few exemplary embodiments among many. No particular terminology or description should be considered limiting on the disclosure or the scope of any claims issuing therefrom.

FIG. 1 is a perspective view of a modular box assembly 100 in a closed position in accordance with one aspect of the present disclosure. The modular box assembly 100 can comprise a box 101 and a variety of accessories configured to adapt the box for different applications, such as shipping hot goods, chilled goods, frozen goods, or goods at ambient temperature. FIGS. 1-18 depict these accessories as well as several different exemplary configurations for the box 101. In one aspect, the box can be adjustable about and between an expanded configuration (illustrated in FIG. 1) in which the box 101 has an expanded volume, and a collapsed configuration (illustrated in FIG. 9) in which the box has a collapsed volume that is less than the expanded volume. In the expanded configuration, the box 101 can be used to contain goods for shipment, and while in the collapsed configuration, the box takes up a minimal amount of space and thus the box 101 can be shipped and stored in the collapsed configuration for space-efficient packing. In use, a user can simply press a portion of the box against a surface, such as the ground, and the box 101 can reconfigure to the expanded configuration.

In the present aspect, the modular box assembly 100 can comprise the box 101, at least one handle 170, and a box top 190. The box can be configured as one aspect of an insulated box 110 comprising at least one insulating liner 2310. The box 101 can comprise a rigid board material such as corrugated cardboard; however in other aspects, the box can comprise other suitable rigid board materials, such as wood, plastic, metal, or any other material. The box 101 can be configured as an uninsulated box, useful when, for example, goods are transported at ambient temperature. In other aspects, however, the insulated box 110 can be configured to transport hot, chilled, or frozen goods, and the at least one liner 2310 can help maintain a desired temperature within the insulated box. The box 101 can also be conveyable, such as on a conveyor belt, and the box can be rigid and strong enough to resist collapse on the conveyor belt. The box 101 is but one example of a box, and the methods discussed below for insulating the box to form the insulated box 110 can be applied to a box of another shape, size, or form.

The box 101 can comprise a first pair of opposing side panels 112a,b and a second pair of opposing side panels 122a,b. That is, the box can comprise a first side panel 112a, a second side panel 112b opposed to the first side panel, a third side panel 122a positioned between the first side panel 112a and the second side panel 112b, and a fourth side panel 122b opposed to the third side panel 122a and positioned between the first and second side panels 112a,b. The side panels 112a,b,122a,b can each be a rigid panel. In one aspect, the side panel 112a can be substantially parallel to the side panel 112b, and the side panel 122a can be substantially parallel to the side panel 122b. Each of the first pair of side panels 112a,b can be substantially perpendicular to the second pair of side panels 122a,b. In one aspect, the box 101 can define a rectangular or square cross-sectional shape; however, in other aspects, the box can define a different cross-sectional shape such as a circular, triangular, pentagonal, or hexagonal, shape or any other desired shape.

The box 101 can have a top end 102 and a bottom end 104 disposed opposite from the top end. In one aspect, each side panel of the second pair of side panels 122a,b can define lips 124a,b, respectively, disposed proximate to the top end 102 of the box. In another aspect, each side panel of the first pair of side panels 112a,b can define lips 114a,b, respectively, disposed proximate to the top end 102 of the box. The box 101 can define a box opening 106 at the top end 102. The box top 190 can be sized and shaped to fit between at least a portion of the first pair of side panels 112a,b and the second pair of side panels 122a,b to cover the box opening when the box is in the closed position. In one aspect, the lips 114a,b,124a,b can be configured to be flush with a top panel 192 of the box top 190 when the box is in the closed position.

The handle 170 can facilitate hand carrying of the box 101. In one aspect, the handle 170 can be formed from a flat paper or tape such as a heavy kraft paper, plastic, posterboard, cardboard, or other suitable materials. In another aspect, the handle 170 can be formed from twisted paper rope. In still other aspects, the handle 170 can comprise a fiber such as cotton, hemp, jute, or bamboo fiber.

In one aspect, the handle 170 can be attached to the box 101 with an adhesive, such as a glue, cement, epoxy, mastic, double-sided tape, cohesive, a water activated tape or any other suitable material. In other aspects, the handle 170 can be mechanically attached, such as with a hook-and-loop fastener, stitching, or staples, and the mechanical attachment of the handle can be configured to be selectively attached and detached from the box 101 such as with hook-and-loop fasteners.

In another aspect, the handle 170 can be a U-shaped handle having a first end 172 and a second end 174 of the handle 170 adhered to the same side panel 122a, and a central portion 176 of the handle extending away from the side panel 122a. The first end 172 and the second end 174 of the handle 170 can be sized and configured such that a surface area of each end 172, 174 is large enough that an adhesive applied to each end 172, 174 and/or the side panel 122a can adhere the handle 170 to the box 101 with sufficient shear strength and with sufficient side-pull strength. For example, if the handle 170 is formed from flat paper, the first end 172 and the second end 174 of the handle 170 can be attached to the side panel 122a with water activated tape. The size of the first end 172 and the second end 174 can be selected so that the ends 172, 174 have sufficient surface area for the water activated tape to securely adhere the ends 172, 174 to the box 101.

In one aspect, the at least one handle 170 can comprise a plurality of handles, such as two, three, four or more handles. In this aspect, each handle 170 can be coupled to the same or a different side panel than the other handles.

Figure 2:
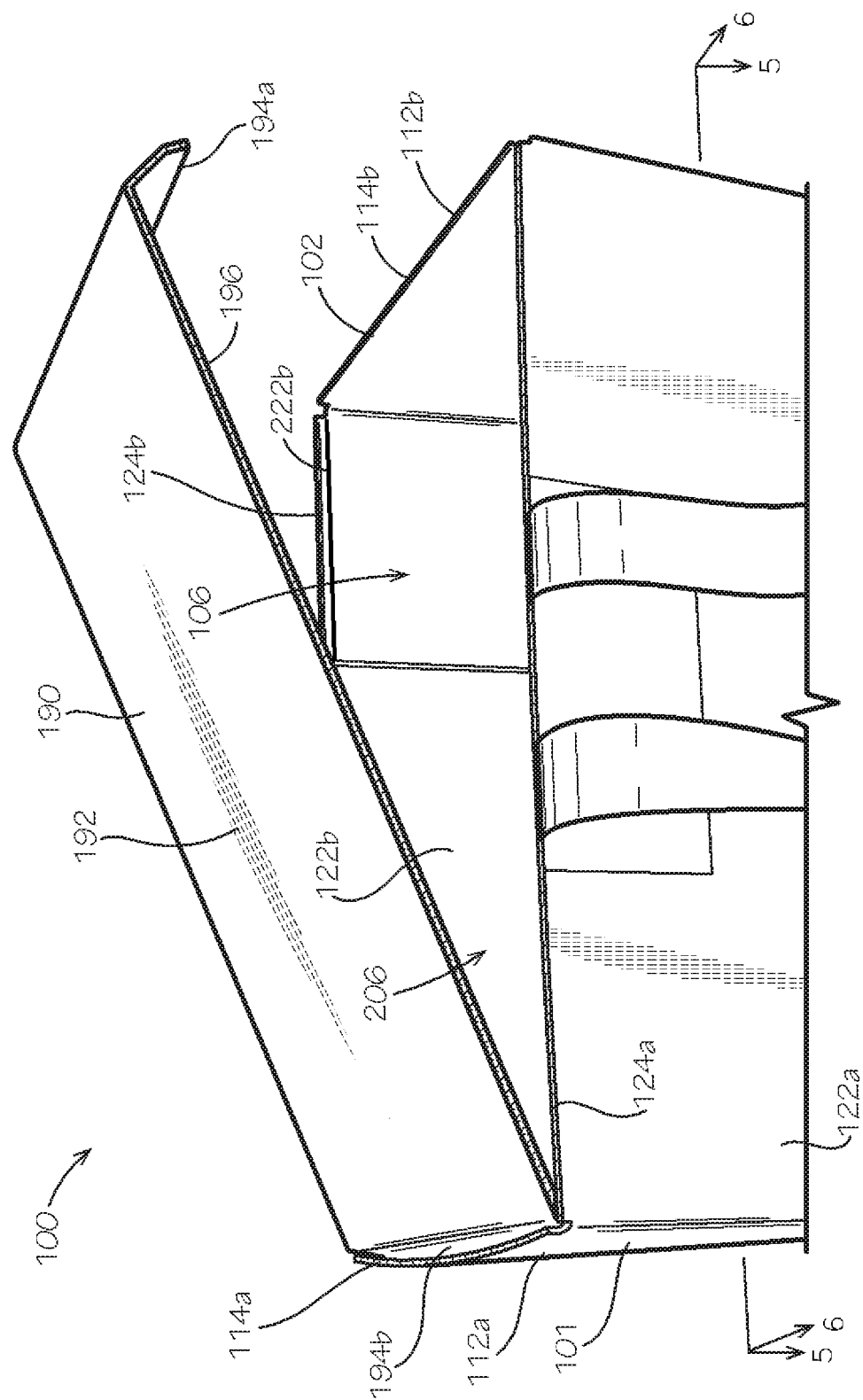
FIG. 2 is a perspective view of the modular box assembly of FIG. 1 in a partially open position.

FIG. 2 is a perspective view of the modular box assembly 100 of FIG. 1 with the box top 190 in a partially open position. In an open position, the box top can be removed from the box opening 106, thereby exposing a box cavity 206 defined within the box 101. The first pair of opposing side panels 112a,b and the second pair of opposing side panels 122a,b of the box 101 can define the box cavity 206. A pair of shoulders 222a,b can extend inwards into the box cavity 206 from each of the side panels 122a,b, as represented by the shoulder 222b (shoulder 222a shown in FIG. 5). The shoulders 222a,b can be spaced from the top end 102 a predetermined distance and can be configured to support the box top 190 when the box top 190 is in the closed position. In the closed position, the box top 190 can cover the box opening 106 and enclose the box cavity 206.

Figure 3:
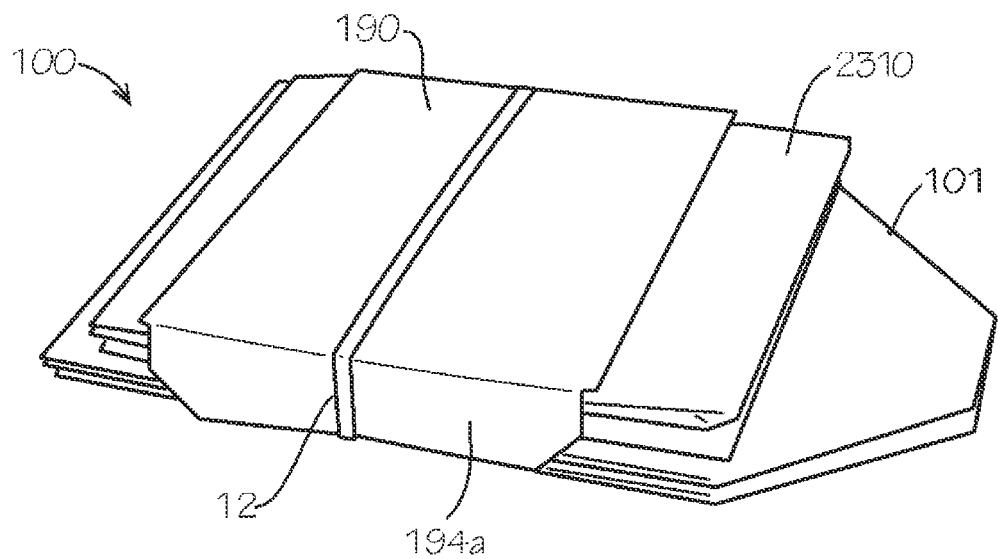
FIG. 3 is a perspective view of the modular box assembly of FIG. 1 in a collapsed and bundled configuration.

FIG. 3 is a perspective view of the modular box assembly 100 of FIG. 1 in a collapsed and bundled configuration, according to one aspect. In this aspect, the box 101 can be in a collapsed configuration as further discussed below with respect to FIG. 9. If the box 101 is an insulated box 110, the insulating liner 2310 can be folded and positioned adjacent to the collapsed box 101, such as on top of the collapsed box 101. The box top 190 can be position on top of the liner 2310 or the collapsed box 101, with a pair of opposed side tabs 194a,b (illustrated in FIG. 4) of the box top 190 wrapping around at least a portion of the liner 2310 and/or the collapsed box 101. That is, in one aspect, the side tabs 194a,b of the box top 190 can be configured to wrap around and help contain the liner 2310 and/or the box 101 when the modular box assembly 100 is in the collapsed and bundled configuration. In another aspect, the modular box assembly 100 can further comprise at least one strap 12 configured to hold the box top 190, the box 101, and/or the liner 2310 in the collapsed and bundled configuration.

Figure 4:
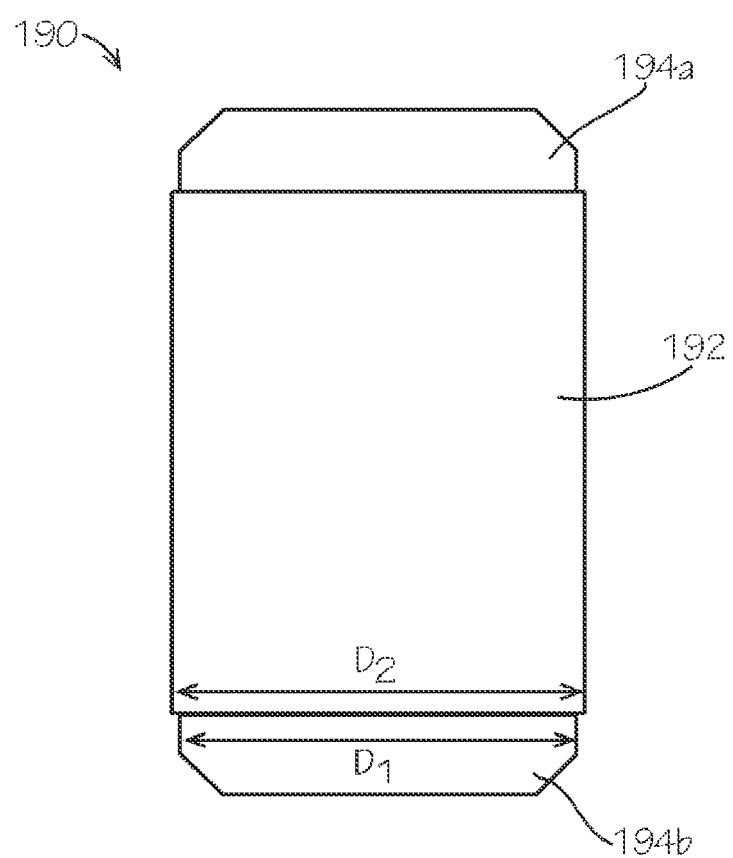
FIG. 4 is a top view of a box blank of the box top of FIG. 1, according to one aspect.

Referring now to FIG. 4, in the present aspect, the box top 190 can be formed separate from the box 101 and can comprise the top panel 192 and the pair of opposed side tabs 194a,b extending away from the top panel 192. In another aspect, each side tab 194a,b can have a width D1 that is less than a width D2 of the top panel 192. In use, described more fully below, the side tabs 194a,b can extend away from the top panel 192 so that the side tabs 194a,b can be positioned in the box cavity 206. The box top 190 can be configured to fit over the top end 102 of the box 101 so that a lower surface 196 of the top panel 192 rests on the shoulders 222a,b of the box 101. The narrower width of the side tabs 194a,b relative to the top panel 192 can allow the side panels 194a,b to fit between the shoulder 222a,b.

In one aspect, the top panel can be a rigid panel. Optionally, in other aspects, the box top can further comprise an insulated panel coupled to the top panel 192. For example, the insulated panel can be positioned beneath the top panel. In other aspects, the box top 190 need not comprise the insulated panel, and the top panel 192 can be uninsulated. The box top can comprise corrugated cardboard in the present aspect; however, in other aspects the box top can be comprise a suitable rigid board material such as wood, plastic, metal, or any other material.

Figure 5:
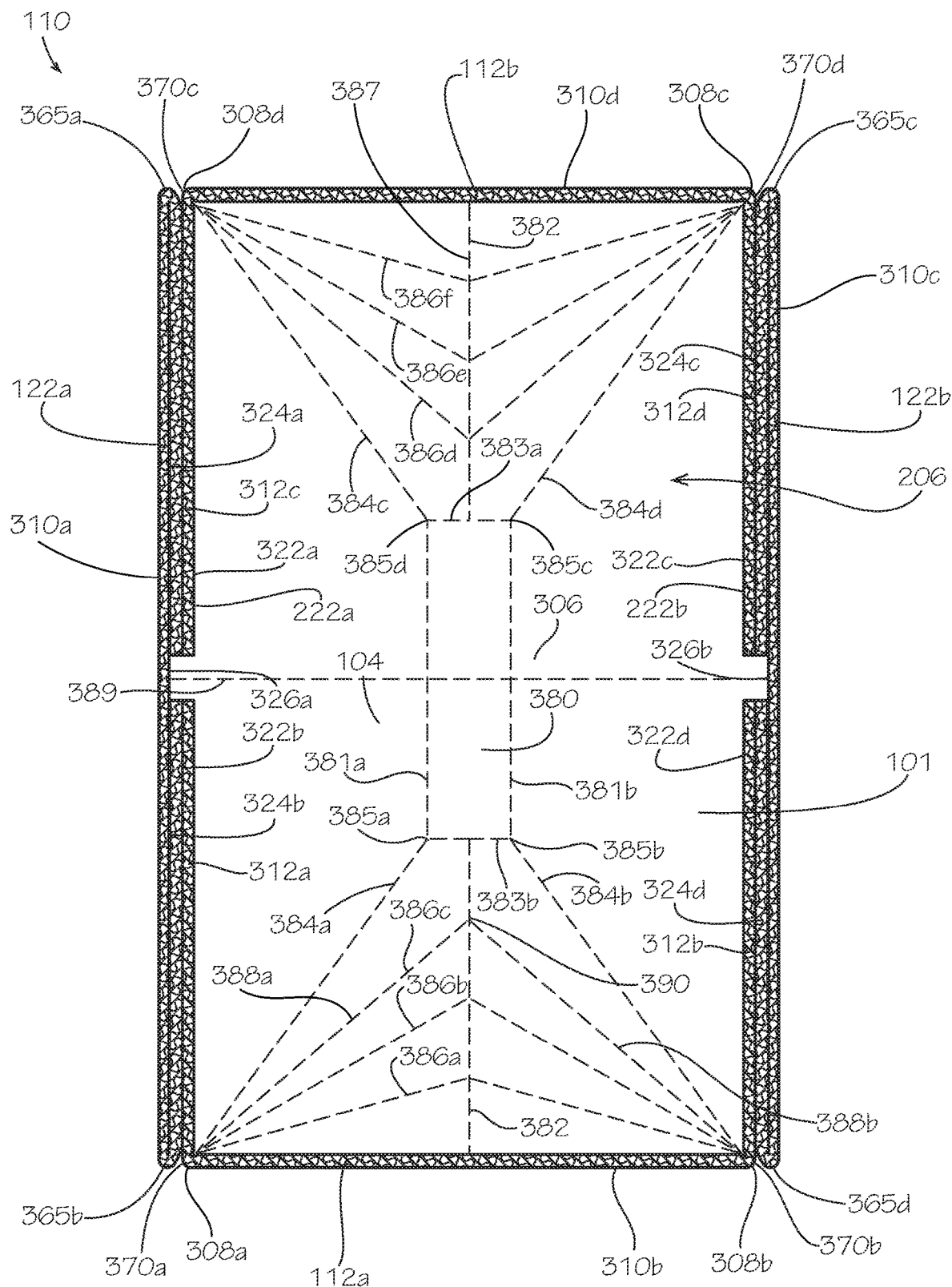
FIG. 5 is a cross-section of the box of FIG. 1 taken along line 5-5 shown in FIG. 2.

FIG. 5 is a cross-section of the box 101 of FIG. 1 taken along line 5-5 shown in FIG. 2, with the handle 170 and the box top 190 removed. In one aspect, each shoulder 222a,b can comprise two sub-shoulders 322. The shoulder 222a can comprise sub-shoulders 322a,b, and the shoulder 222b can comprise sub-shoulders 322c,d. The sub-shoulders 322a-d can be defined by a plurality of first wings 312a-d and a plurality of second wings 324a-d. The first wings 312a,b can be attached at opposite sides of the side panel 112a, and the first wings 312c,d can be attached at opposite sides of the side panel 112b. The second wings 324a,b can be attached at opposite sides of the side panel 122a, and the second wings 324c,d can be attached at opposite sides of the side panel 122b.

The second wing 324a can be folded inwards at a hinge 365a and positioned adjacent to an inner side surface 326a of by the side panel 122a, and the first wing 312c can be folded at a hinge 370c and positioned adjacent to the second wing 324a. The second wing 324a and the first wing 312c can be secured in position, such as with an adhesive, to form the sub-shoulder 322a. The second wing 324b can be folded inwards at a hinge 365b and positioned adjacent to the inner side surface 326a, and the first wing 312a can be folded at a hinge 370a and positioned adjacent to the second wing 324b. The second wing 324b and the first wing 312a can be secured in position, such as with an adhesive, to form the sub-shoulder 322b.

To form the sub-shoulder 322c of shoulder 222b, the second wing 324c can be folded inward at a hinge 365c and positioned adjacent to an inner side surface 326b of by the side panel 122b. The first wing 312d can be folded at a hinge 370d and positioned adjacent to the second wing 324c. The first wing 312d and the second wing 324c can be secured in position, such as with an adhesive, to form the sub-shoulder 322c. To form the sub-shoulder 322d of shoulder 222b, the second wing 324d can be folded inward at a hinge 365d and positioned adjacent to the inner side surface 326b. The first wing 312b can be folded at a hinge 370b and positioned adjacent to the second wing 324d. The first wing 312b and the second wing 324d can be secured in position, such as with an adhesive, to form the sub-shoulder 322d.

The formation of the sub-shoulders 322a-d can also secure each of the first pair of side panels 112a,b to each of the second pair of side panels 122a,b, thereby defining the square or rectangular horizontal cross-section of the box 101. In one aspect, the box can further comprise a bottom panel 306. The bottom panel can be a rigid panel. The bottom panel 306 can be disposed at the bottom end 104 of the box 101, and the bottom panel 306 can be attached to each of the side panels 112a,b,122a,b. The bottom panel can further define the box cavity 206. According to example aspects, the bottom panel 306 can define a square or rectangular shape defined by four bottom panel edges 310a-d. The bottom panel 306 can further define four bottom panel corners 308a-d, as shown.

In the present aspect, the bottom panel 306 can define a center subpanel 380 disposed substantially at a center of the bottom panel 306. The center subpanel 380 can be substantially rectangular in shape. A center fold line 382 such as, for example, a scored crease, can extend between the center subpanel 380 and each side panel 112a,b, and the center fold line can substantially bisect the bottom panel 306, with the exception of within the center subpanel 380. The center fold line 382 can also bisect each side panel 112a,b, as shown and further described with respect to FIG. 7. Example aspects of the center fold line 382 can be substantially aligned with a longitudinal center line 387 of the box 101, as shown. A transverse center line 389 of the box 101 can be oriented about perpendicular to the longitudinal center line 387 and the center fold line 382. In one aspect, and with respect to FIG. 8, the center fold line 382 can comprise a double center fold line. That is, the center fold line can comprise at least a first center fold line 382a and a second center fold line 382b positioned adjacent to each other. In this aspect, the center fold line can comprise two substantially parallel fold lines spaced a predetermined distance apart. In another aspect, the distance between the center fold lines 382a,b can be less than a width of the center subpanel 380. According to example aspects, the rectangular center subpanel 380 can be defined by a first pair of edge fold lines 381a,b extending in a longitudinal direction and a second pair of edge fold lines 383a,b extending transverse to the first pair of edge fold lines 381a,b. The center subpanel 380 can define four subpanel corners 385a-d, wherein each subpanel corner 385a-d can join a corresponding one of the first pair of edge fold lines 381a,b with a corresponding one of the second pair of edge fold lines 383a,b.

In one aspect, four corner fold lines 384a-d can extend between the corners of the center subpanel 380 and the hinges 370a-d. For example, a first corner fold line 384a can extend from a first hinge 370a to the center subpanel 380, a second corner fold line 384b can extend from a second hinge 370b to the center subpanel 380, a third corner fold line 384c can extend from a third hinge 370c to the center subpanel 380 and a fourth corner fold line 384d can extend from a fourth hinge 370d to the center subpanel 380.

A plurality of V-shaped fold lines 386a-f can extend between the hinges 370a-d and the center fold line 382. In one aspect, the V-shaped fold lines 386a-c can each extend from the first hinge 370a to the center fold line 382 and then to the second hinge 370b. The V-shaped fold lines 386a-c can be defined between the corner fold lines 384a and 384b. The V-shaped fold lines 386d-f can each extend from the third hinge 370c to the center fold line 382 and then to the fourth hinge 370d. The V-shaped fold lines 386d-f can be defined between the corner fold lines 384c and 384d. In use, the center subpanel 380, the center fold line 382, the corner fold lines 384a-d, and the V-shaped fold lines 386a-f can cooperate to collapse the box 101. Optionally, the center subpanel 380, the center fold line 382, the corner fold lines 384a-d, and the V-shaped fold lines 386a-f can provide the bottom panel with a truncated pyramidal shape when collapsed, as further discussed below with respect to FIG. 9. As shown, each of the V-shaped fold lines 386a-f can comprise a first fold line 388a and a second fold line 388b. For example, each of the V-shaped fold lines 386a-c can define the first fold line 388a extending from the first corner to the center fold line 382 (i.e., the longitudinal center line 387) and the corresponding second fold line 388b extending from the second corner to the center fold line 382, such the each pair of corresponding first and second fold lines 388a,b meet at an apex 190 along the center fold line.

Figure 6:
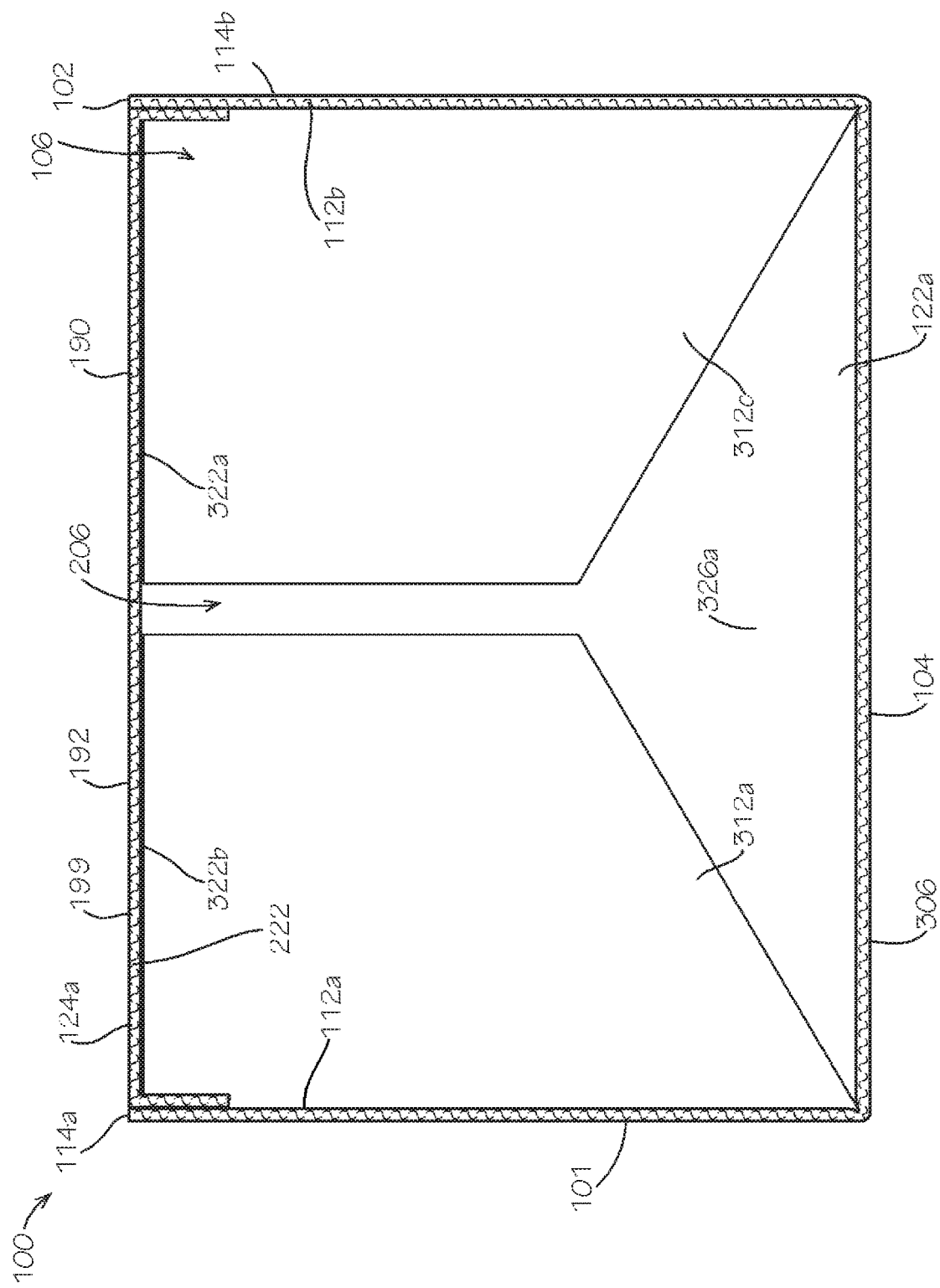
FIG. 6 is a cross-section of the modular box assembly of FIG. 1 taken along line 6-6 shown in FIG. 2.

FIG. 6 is a cross-section of the modular box assembly 100 of FIG. 1 taken along line 6-6 shown in FIG. 2. In the present view, the handle 170 has been removed for clarity. In one aspect, the box top 190 can be positioned on the two sub-shoulders 322a,b of the box 101 such that an upper surface 199 of the top panel 192 of the box top 190 is substantially flush with the top end 102 of the box 101. In one aspect, at least one of the bottom panel 306 and the side panels 112a,b can have a single wall material thickness. In another aspect, at least one of the bottom panel and the side panels 112a,b can be uninsulated.

Figure 7:
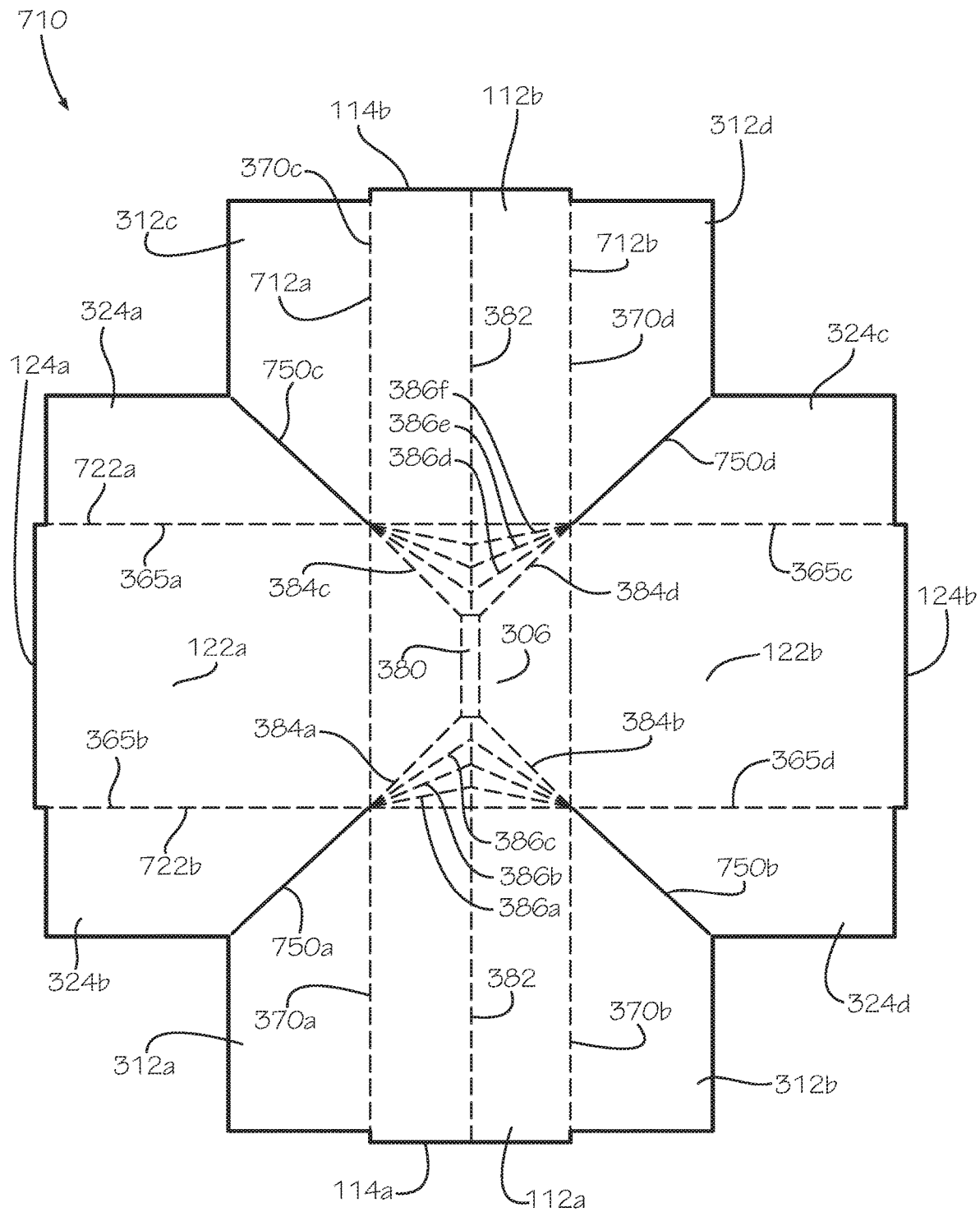
FIG. 7 is a top view of a box blank of the box of FIG. 1, according to one aspect.
Figure 8:
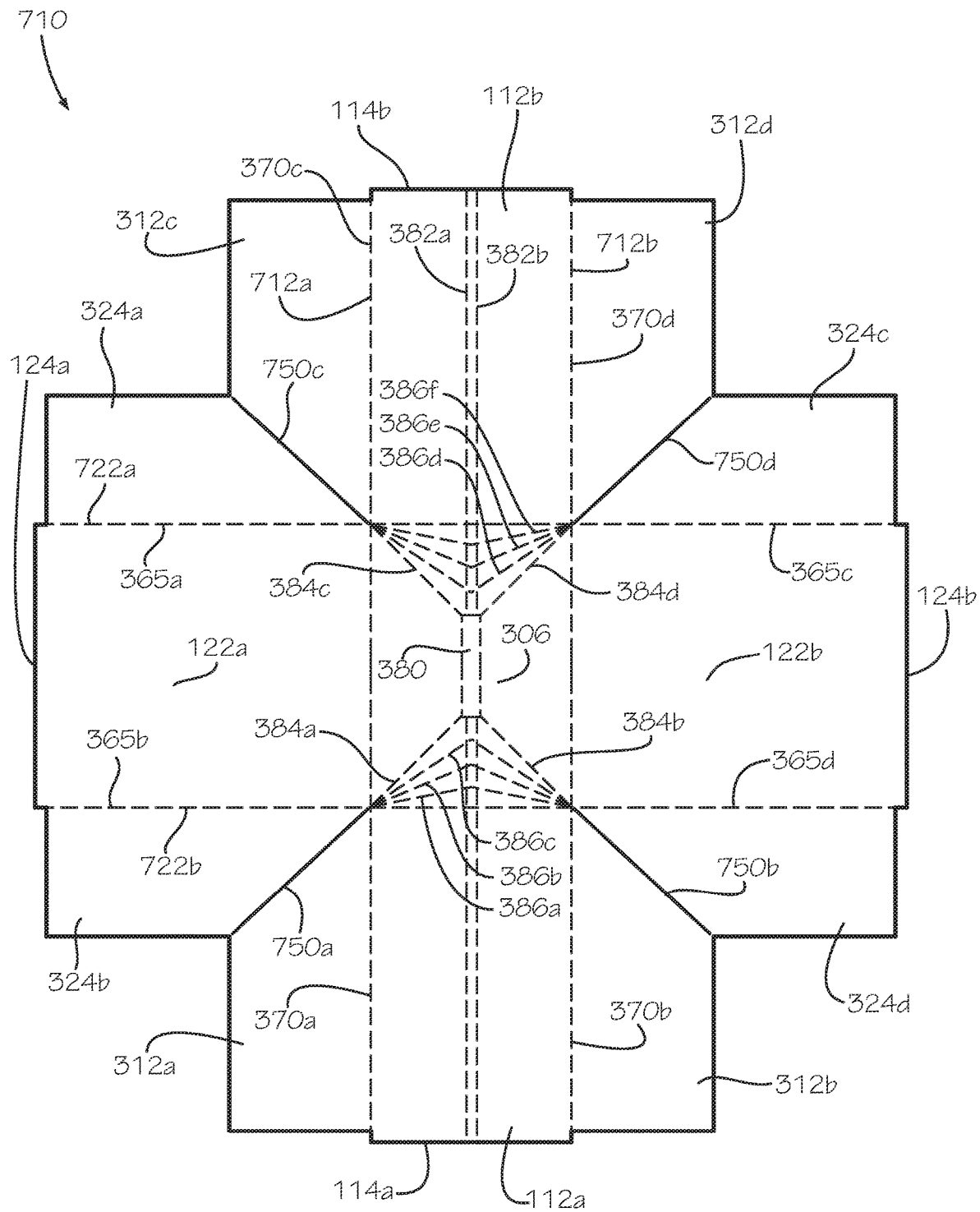
FIG. 8 is a top view of a box blank of the box of FIG. 1, according to one aspect.

FIGS. 7 and 8 are top views of box blanks 710 which can be assembled to form the box 101. In one aspect, the box blank 710 can define four corner fold lines 750a-d, such as a scored crease. In other aspects, the box blank 710 can define cuts in place of the corner fold lines 750a-d. A first corner fold line 750a can extend outwards from the bottom panel 306 to separate the first wing 312a from the second wing 324b. A second corner fold line 750b can extend outwards from the bottom panel 306 to separate the first wing 312b from the second wing 324d. A third corner fold line 750c can extend outwards from the bottom panel 306 to separate the first wing 312c from the second wing 324a. A fourth corner fold line 750d can extend outwards from the bottom panel 306 to separate the first wing 312d from the second wing 324c. In the present aspect, the adjacent first wings 312a-d and first wings 324a-d can be hingedly connected by the corner fold lines 750a-d. In other aspects, the corner fold lines 750a-d can be cuts which separate the adjacent first wings 312a-d and second wings 324a-d.

In one aspect, the box blank 710 can further define a first length fold line 712a and a second length fold line 712b extending from the side panel 112a to the side panel 112b. The first length fold line 712a can facilitate folding of the first wing 312a relative to the side panel 112a, the side panel 122a relative to the bottom panel 306, and the first wing 312c relative to the second side panel 112b. The second length fold line 712b can facilitate folding of the first wing 312b relative to the side panel 112a, the side panel 122b relative to the bottom panel 306, and the first wing 312d relative to the side panel 112b.

The box blank 710 can further define a first width fold line 722a and a second width fold line 722b. In one aspect, the width fold lines 722a,b can be substantially perpendicular to the length fold lines 712a,b. The first width fold line 722a can facilitate folding of the second wing 324a relative to the side panel 122a, the side panel 112b relative to the bottom panel 306, and the second wing 324c relative to the side panel 122b. The second width fold line 722b can facilitate folding of the second wing 324b relative to the side panel 122a, the side panel 112a relative to the bottom panel 306, and the second wing 324d relative to the side panel 122b.

Figure 9:
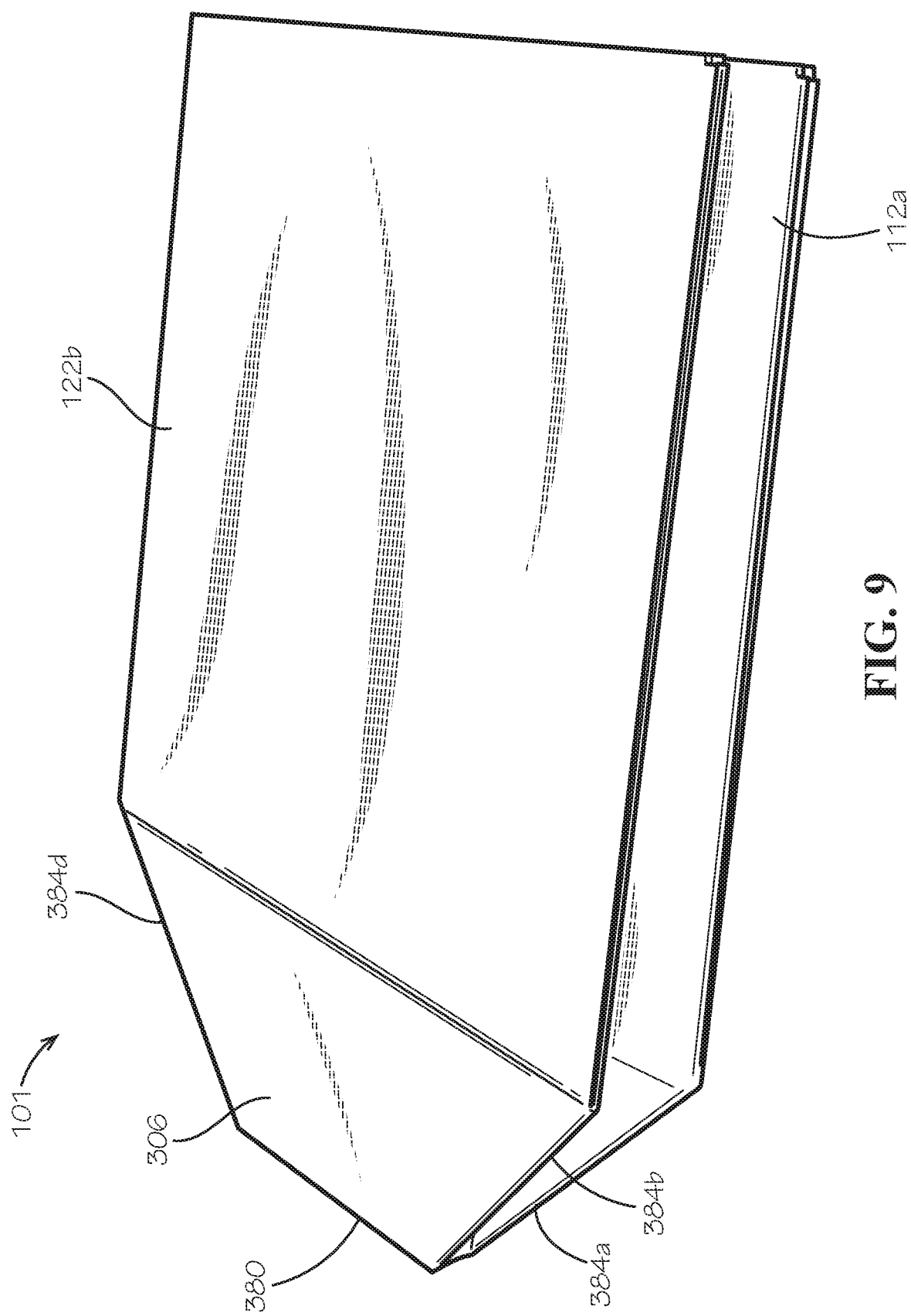
FIG. 9 is a perspective view of the box of FIG. 1 in a collapsed configuration.

The center fold line 382 can extend across and substantially bisect each side panel 112a,b. In one aspect, the center fold line can facilitate each of the side panels 112a,b folding inwards about the center fold line 382 and towards the bottom panel 306 to facilitate collapsing the box 101 as shown in FIG. 9. If the center fold line comprise a double center fold line 382a,b, as illustrated in FIG. 8, the center fold lines can facilitate each of the side panels 112a,b more easily folding inwards about the first center fold line 382a and the second center fold line 382b and towards the bottom panel 306 to facilitate collapsing the box 101.

FIG. 9 is a perspective view of the box 101 of FIG. 1 in a collapsed configuration. In the present view, the handle 170 and the box top 190 are removed for clarity. As the box 101 collapses, the side panels 122a,b move inwards and towards one another, and the side panels 112a,b fold inwards towards one another. The V-shaped fold lines 386a-f (shown in FIG. 5) cooperate to transition the bottom panel 306 from a substantially planar shape to the truncated pyramidal shape. In the truncated pyramidal shape, the center subpanel 380 extends outwards and away from the side panels 112*a,b* and the side panels 122*a,b*. Exerting a force upon the center subpanel 380, such as by positioning the center subpanel on a surface and urging the side panels 112*a,b*, 122*a,b* towards the center subpanel 380 can cause the box to self-expand into an expanded configuration (shown in FIG. 1) with a substantially rectangular prism shape. The self-expanding action can be desirable to allow for quick and easy reconfiguration of the box 101, unlike many boxes which must be folded and taped together. The box can be shipped and stored in the collapsed configuration for space-efficient packing, and a user can simply press upon the center subpanel 380, such as by pressing the center subpanel against the ground, and the box 101 can reconfigure to the expanded configuration.

With reference again to FIGS. 1 and 2, the box top 190 can be positioned on the box 101 to cover the box opening 106 and enclose the box cavity 206. In one aspect, the box top 190 can comprise the top panel 192 and a pair of side tabs, as represented by side tabs 194*a,b* extending down from the top panel 192. The box top 190 can be configured to fit over the top end 102 of the box 101 so that the lower surface 196 of the top panel rests on the shoulders 222*a,b* of the box. The side tabs can extend away from the top panel 192 so that the side tabs 194*a,b* can be positioned in the box cavity 206. In one aspect, the lips 114*a,b*,124*a,b* can extend upwards from the shoulders 222*a,b* by a height substantially equal to a thickness of the top panel 192 such that the top panel rests substantially flush with the lips 114*a,b*,124*a,b* (as illustrated in FIG. 1). That is, with the box top 190 in the closed position, the top panel 192 can be substantially flush with the top end 102 of the box 101. In other aspects, the lips 114*a,b*,124*a,b* can extend upwards beyond the top panel 190.

The box top 190 can be secured to the box 101 by tape, banding, a strap, adhesive, or other restraint mechanism. For example, at least one tape strip 198 can extend from the side panel 112*a*, over the top panel 192, and down the side panel 112*b* to secure the top panel to the box 101. In some aspects, the tape can be a water activated tape or any other suitable material.

In one aspect, the rigidity of the box top 190 can be desirable to prevent inadvertent collapse of the box 101. Collapse of one aspect of the box is demonstrated in FIG. 9. Inadvertent or accidental collapse of the box 101 during shipping or handling can crush or damage the contents of the box. By placing the box top in the box cavity 206 such that the side tabs 194*a,b* of the box top 190 can engage or contact the side panels 112*a,b* of the box, the rigidity of the box top can prevent or restrict folding of the bottom panel 306 along the center fold line 382, the corner fold lines 384*a-d*, and/or the V-shaped fold lines 386*a-f*, thereby preventing collapse of the box 101.

Figure 10:
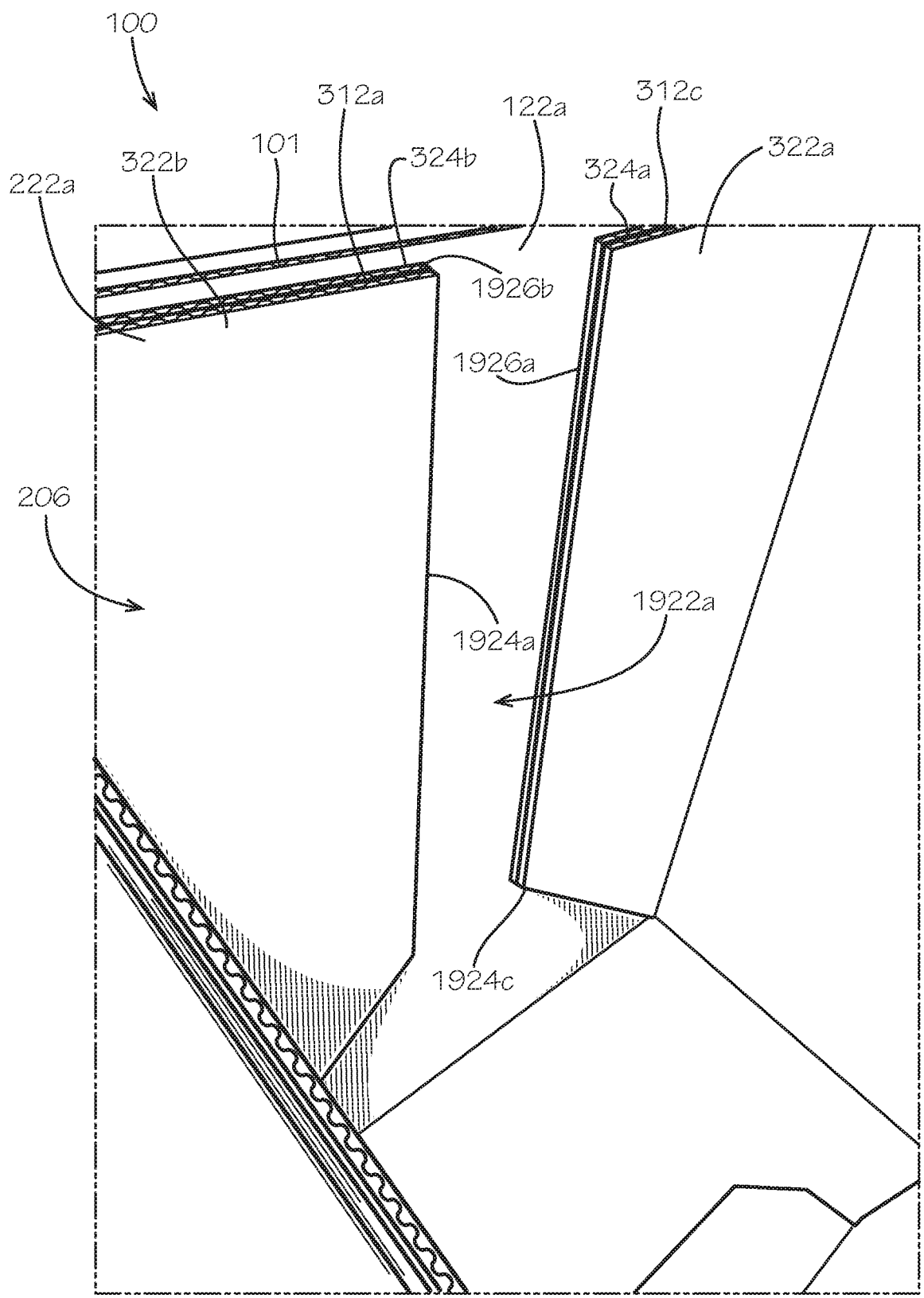
FIG. 10 is a perspective view of an inner portion of the box of FIG. 1, in accordance with one aspect.
Figure 11:
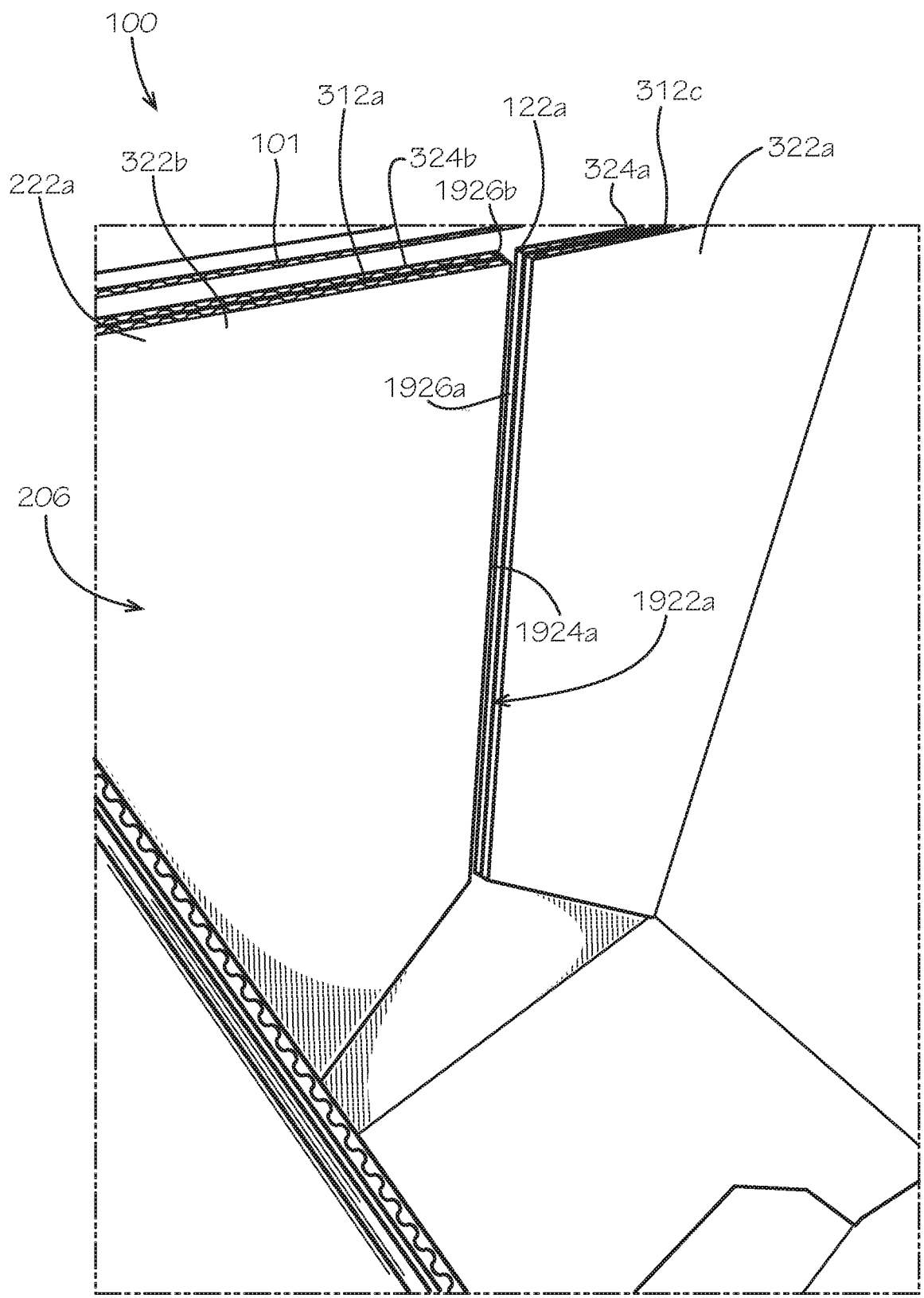
FIG. 11 is a perspective view of an inner portion of the box of FIG. 1, in accordance with one aspect.

FIGS. 10 and 11 are perspective views of the interior of the box 101 in the expanded configuration, according to various aspects. As demonstrated by the shoulder 222*a*, each shoulder 222*a,b* can define a shoulder channel 1922*a,b*. In one aspect, a first shoulder channel 1922*a* can be defined by the side panel 122*a* and the two sub-shoulders 322*a,b* of the shoulder 222*a*, and a second shoulder channel 1922*b* can be defined by the side panel 122*b* and the two sub-shoulders 322*c,d* of the shoulder 222*b*. The shoulder channel 1922*a* can be representative of both shoulder channels 1922*a,b*, though shoulder channel 1922*a* is not necessarily representative of both shoulder channels 1922*a,b*.

In one aspect, each shoulder channel 1922*a,b* can have a channel width having a predetermined distance. For example and as illustrated in FIG. 10, the channel width can be greater than zero such that a distal edge 1924*a* of the first wing 312*a* is spaced from a distal edge 1924*c* of the first wing 312*c*, and a distal edge 1926*a* of the second wing 324*a* is spaced from a distal edge 1926*b* of the second wing 324*b*. In another example and as illustrated in FIG. 11, the channel width can be substantially zero such that the distal edge 1924*a* of the first wing 312*a* is adjacent to and/or in contact with the distal edge 1924*c* of the first wing 312*c* and the distal edge 1926*a* of the second wing 324*a* is adjacent to and/or in contact with the distal edge 1926*b* of the second wing 324*b*. In another aspect, the predetermined distance of the channel width of each shoulder channel 1922*a,b* can be any distance between zero and the width of the side panel 122*a,b*.

In the present aspect, the first wings 312*a,c* can be substantially flush with the second wings 324*a,b* of the sub-shoulders 322*a,b*. In other aspects, the first wings 312*a,c* can extend further into the support channel 1922*a* than the second wings 324*a,b* to provide a groove (not shown) between the first wing 312*a*, the second wing 324*b*, and the side panel 122*a* and another groove between the first wing 312*c*, the second wing 324*b*, and the side panel 122*a*.

Figure 12:
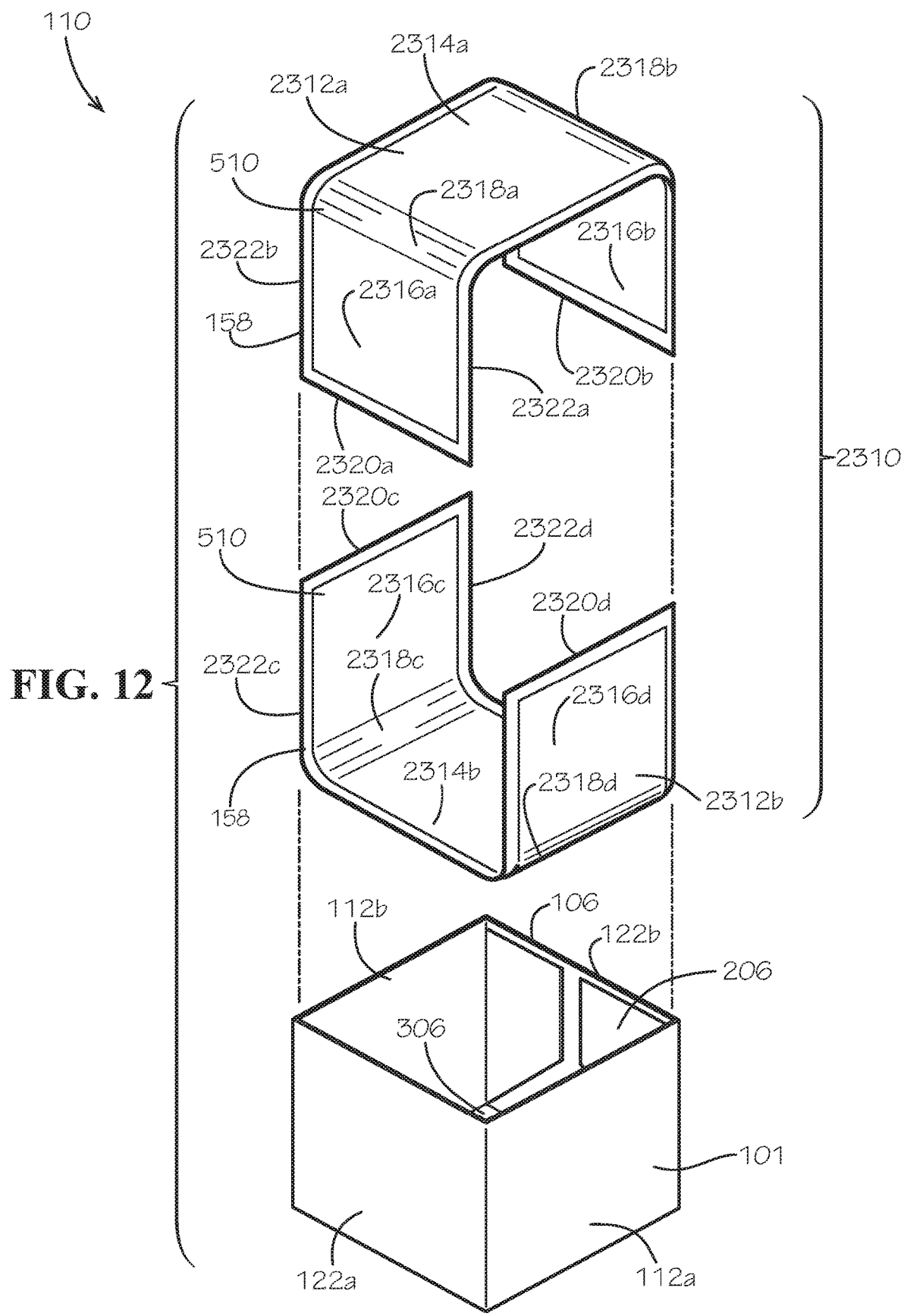
FIG. 12 is an exploded perspective view of the box of FIG. 1, in which the box is an insulated box comprising at least one liner, according to one aspect.

In one aspect, the box 101 can be the insulated box 110 comprising at least one liner 2310, such as an A-B liner and the like configured to be positioned in the box cavity 206 of the box. FIG. 12 is an exploded perspective view of an insulated box in accordance with another aspect of the present disclosure. The insulated box 110 of the present aspect can be an internally insulated box. In another aspect, the liner can be easily insertable and/or removable from the box cavity 206 of the insulated box 110.

In one aspect, the liner 2310 can comprise a first liner 2312*a* and a second liner 2312*b*. In this aspect, each of the first liner and the second liner can be formed by insulated panels 510 which can each be folded into a desired shape, such as, for example and without limitation, C-shaped, U-shaped and L-shaped.

The first liner 2312*a* can comprise a center panel 2314*a* disposed between at least one of a first liner side panel 2316*a* and a second liner side panel 2316*b*. A border 158 of the first liner 2312*a* can comprise a first end border portion 2320*a* defined by the first liner side panel 2316*a* and a second end border portion 2320*b* defined by the second liner side panel 2316*b* and disposed opposite from the first end portion 2320*a*. A fold 2318*a* can be defined between the first liner side panel 2316*a* and the center panel 2314*a*, and a fold 2318*b* can be defined between the second liner side panel 2316*b* and the center panel 2314*a*. A pair of side border portions 2322*a,b* of the border 158 can be defined by the liner side panels 2316*a,b* and the center panel 2314*a*, and the side border portions 2322*a,b* can extend between the respective end border portions 2320*a,b*.

The second liner 2312*b* can comprise a center panel 2314*b* disposed between at least one of a first liner side panel 2316*c* and a second liner side panel 2316*d*. The border 158 of the second liner 2312*b* can comprise a first end border portion 2320*c* defined by the first liner side panel 2316*c* and a second end border portion 2320*d* defined by the second liner side panel 2316*d* and disposed opposite from the first end border portion 2320*c*. A fold 2318*c* can be defined between the first liner side panel 2316*c* and the center panel 2314*b*, and a fold 2318*d* can be defined between the second liner side panel 2316*d* and the center panel 2314*b*. A pair of side border portions 2322*c,d* of the border 158 can be defined by the liner side panels 2316*c,d* and the center panel 2314*b*, and the side border portions 2322*c,d* can extend between the respective end border portions 2320*c,d*.

The first liner 2312*a* and the second liner 2312*b* can fit together to define a substantially cubic or rectangular prism shape with an inner insulated cavity (not shown) defined by the A-B liner 2310. The end border portions 2320*a,b* of the border 158 of the first liner 2312*a* can contact the center panel 2314*b* of the second liner 2312*b*, and the end border portions 2320*c,d* of the border 158 of the second liner 2312*b* can contact the center panel 2314*a* of the first liner 2312*a*. The side border portions 2322*c,d* of the border 158 of the second liner 2312*b* can each extend around the sides of a different one of the liner side panels 2316*a,b*. The side border portions 2322*a,b* of the border 158 of the first liner 2312*a* can each extend around the sides of a different one of the liner side panels 2316*c,d*.

In the present aspect, the liner 2310 can be oriented so that the center panel 2314*a* of the first liner 2312*a* substantially covers the box opening 106 of the box 101, the center panel 2314*b* of the second liner 2312*b* substantially covers the bottom panel 306, and the liner side panels 2316*a,b,c,d* substantially cover the side panels 112*a,b*,122*a,b* of the box 101. In the present aspect, the side panels liner 2316*a,b* can substantially cover the side panels 122*a,b*, and the side panels liner 2316*c,d* can substantially cover the side panels 112*a,b*. In other aspects, the side panels liner 2316*a,b* can substantially cover the side panels 112*a,b*, and the liner side panels 2316*c,d* can substantially cover the side panels 122*a,b*.

Figure 13:
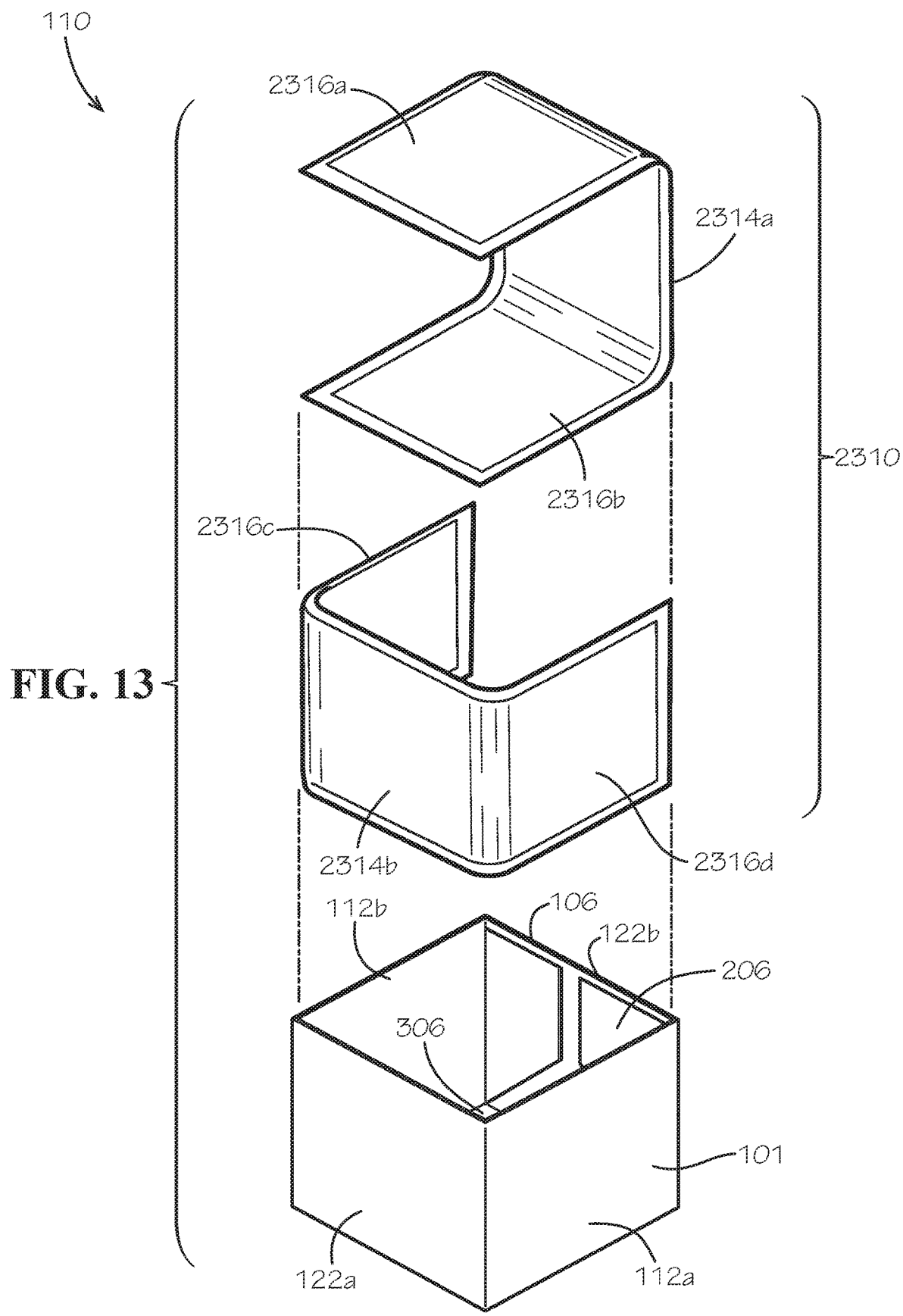
FIG. 13 is an exploded perspective view of the box of FIG. 1, in which the box is an insulated box comprising at least one liner, according to one aspect

In still other aspects and as illustrated in FIG. 13, the liner 2310 can be orientated such that the first liner side panel 2316*a* of the first liner 2312*a* substantially covers the box opening 106, and the second liner side panel 2316*b* of the first liner 2312*a* substantially covers the bottom panel 306 of the box 101. The side panels 112*a,b*,122*a,b* of the box 101 can be substantially covered by the second liner 2312*b* and the center panel 2314*a* of the first liner 2312*a*. Such a configuration can be desirable because the first liner side panel 2316*a* can act as a lid which can be folded about the fold 2318*a* to open and close the inner insulated cavity of the liner 2310 without requiring removal of either of the first and second liners 2312*a,b* from the insulated box 110. As can be appreciated, other arrangements of the first liner 2312*a* relative to the second liner 2312*b* are contemplated.

In one aspect, the liner 2310 can be the A-B liner configured such that the first liner 2312*a* engages portions of the second liner 2312*b* to form the inner insulated cavity of the liner 2310, as shown in FIGS. 12 and 13. That is, the first liner and the second liner can be arranged in a "trunk-lid" configuration. Optionally, in other aspects, in applications in which less insulation is needed or desired, only one of the first liner 2312*a* or the second liner 2312*b* can be positioned in the box cavity 206. In this aspect, for example, the second liner 2312*b* can be oriented so that the center panel 2314*b* of the second liner 2312*b* substantially covers the bottom panel 306, and the liner side panels 2316*c,d* of the second liner substantially cover the side panels 112*a,b* of the box 101. Note that less insulation can be needed along side panels 122*a* and 122 because of the triple-wall material thickness on these panels, as can be seen in FIG. 5.

Figure 14:
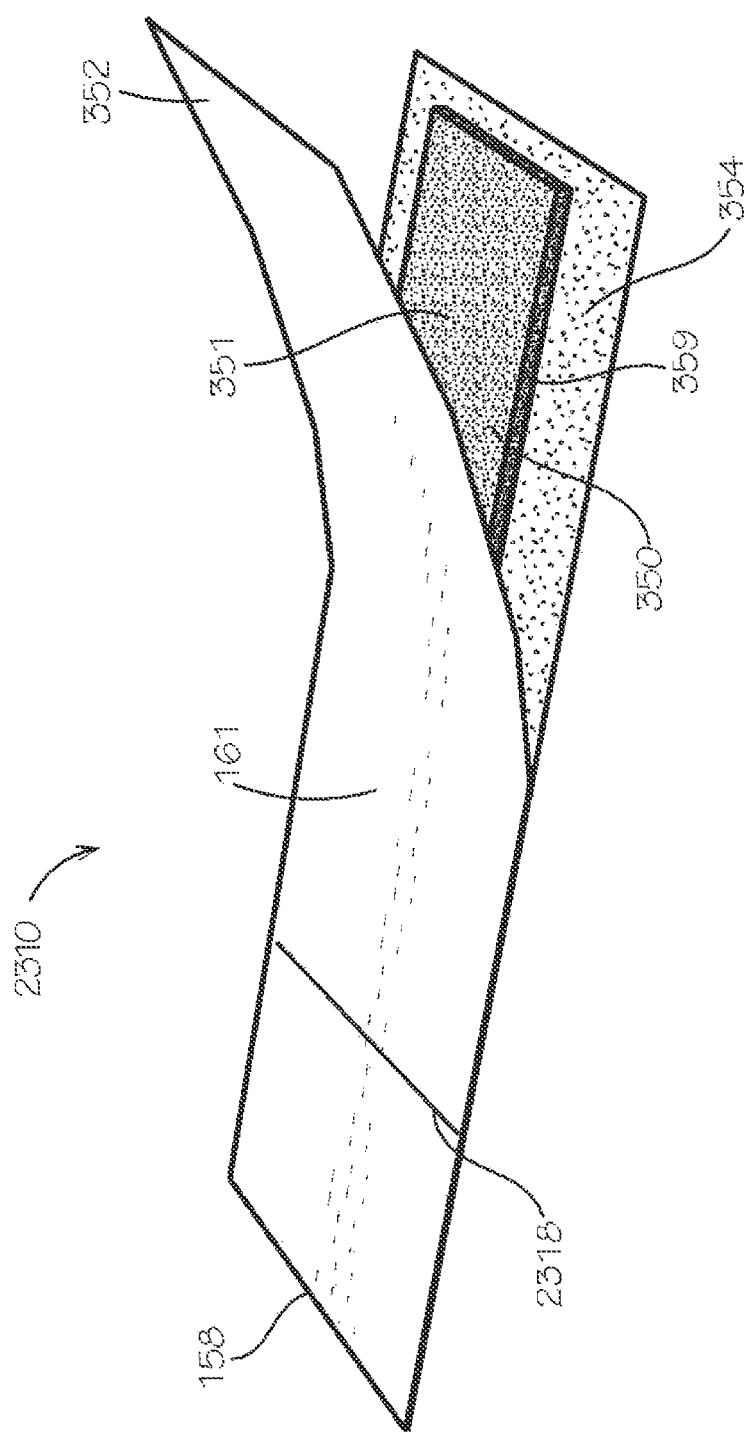
FIG. 14 is a perspective view of a liner of the insulated box of FIGS. 12 and 13, in which a portion of the liner is disassembled to show the interior of the liner.

Referring now to FIG. 14, in one aspect, the liner 2310 can comprise an insulation batt 350, a first sheet 352, and a second sheet 354. In another aspect, the first sheet 352 and the second sheet 354 can be sized and shaped complimentary to each other; however in some aspects, the sheets 352,354 can differ in size and shape. The insulation batt 350 and the sheets 352,354 can each be flat and substantially planar before assembly. In the present aspect, the insulation batt 350 can be approximately ⅜ inches thick; however this thickness is not limiting. The thickness can range from ¹⁄₁₆ inches to over 2 inches, such as a range of ¼ inches to ½ inches.

The insulation batt 350 can be positioned between the first sheet 352 and the second sheet 354 in a panel cavity 351 defined between the first sheet and the second sheet. The sheets 352,354 can be sized to overhang the insulation batt 350 on all sides with perimeter portions of the first sheet and second sheet extending beyond a perimeter 359 of the insulation batt 350. In one aspect, the insulation batt can be encapsulated by the border 158 which can extend around the perimeter of the insulation batt 350, thereby sealing the panel cavity 351. The panel cavity containing the insulation batt can define an insulated portion 161 of the liner 2310. In another aspect, the border 158 can be a seam formed by attaching a perimeter portion of the first sheet 352 which overhangs the perimeter 359 of the insulation batt 350 with a perimeter portion of the second sheet 354 which also overhangs the perimeter 359 of the insulation batt 350. The first sheet 352 can be attached to the second sheet 354 with an adhesive such as a glue, cement, epoxy, mastic, cohesive, double-side tape or other suitable adhesive to form the border 158. In some aspects, the border 158 can be formed by mechanically fastening the first sheet 352 to the second sheet 354, such as by stapling, stitching, or any other suitable method of fastening.

The fold 2318 can be defined in the liner 2310 a predetermined distance from the border 158. For example, the fold 2318*a* and the fold 2318*b* can be substantially equally spaced relative to the border of the first liner 2312*a* so that the first liner side panel 2316*a* and the second liner side panel 2316*b* have substantially the same area. In one aspect, the insulation batt 350 can extend through each fold 2318. In other aspects, however, the insulation batt can be disjoint so that the insulation batt 350 does not extend through the fold such that the side panels and the center panels 2314 are easily folded relative to each other.

Figure 15:
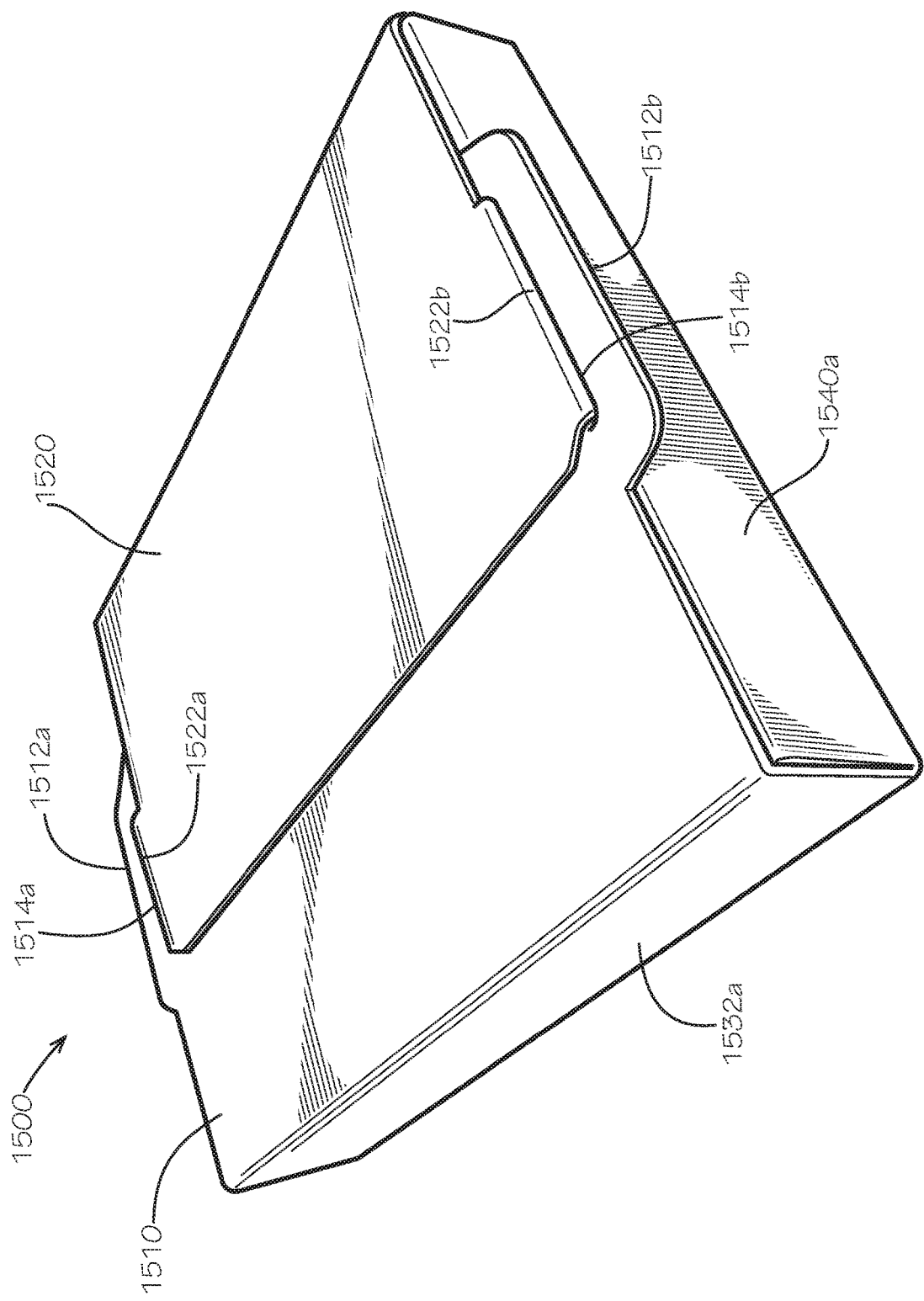
FIG. 15 is a perspective view of an inner box in accordance with one aspect of the present disclosure.
Figure 16:
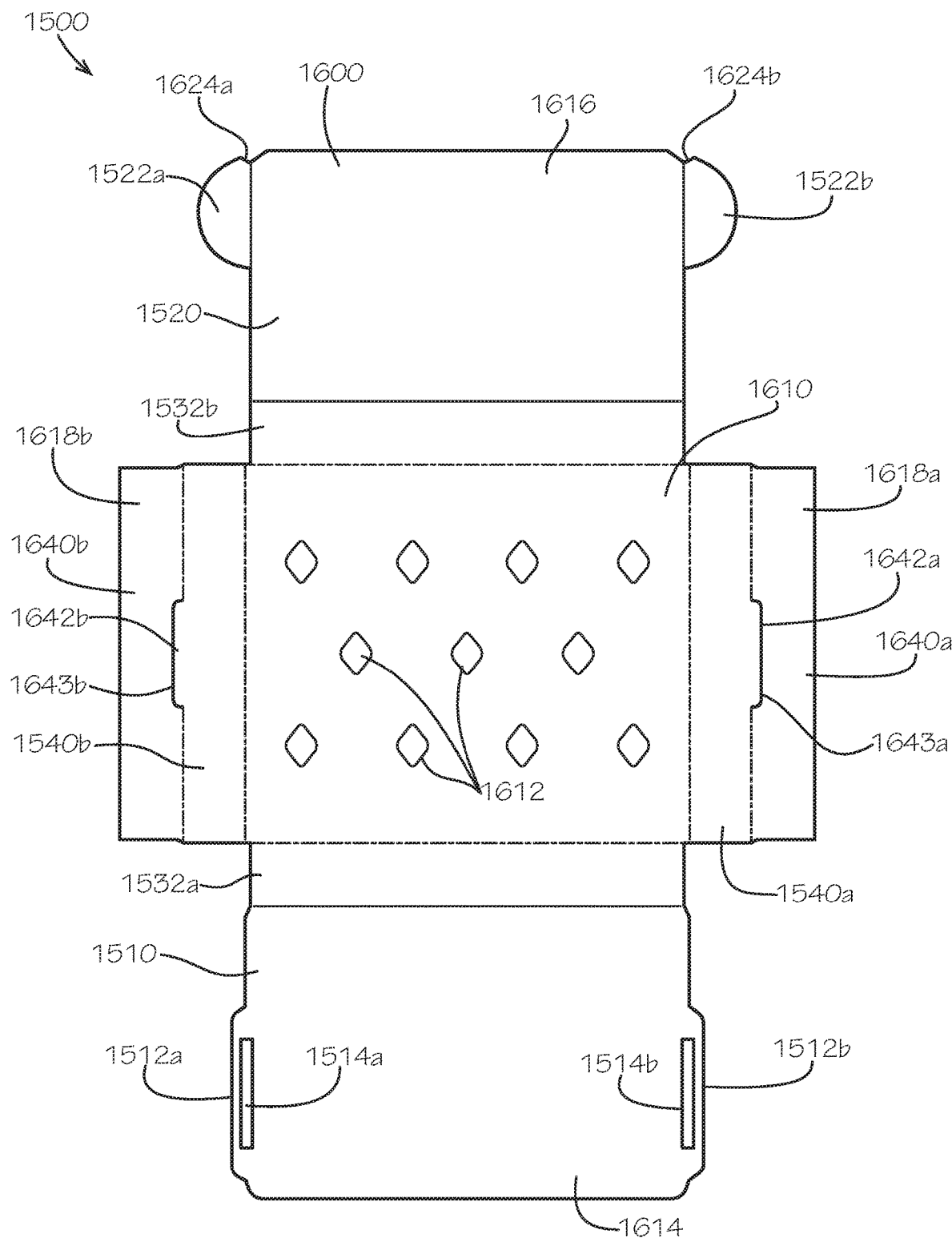
FIG. 16 is a top view of an inner box blank of the inner box of FIG. 15.

FIG. 15 is a perspective view of an inner box 1500, according to one aspect, and FIG. 16 is a top view of an inner box blank 1600 of the inner box 1500. The inner box blank 1600 can comprise a center panel 1610, a pair of side flap panels 1618*a,b* attached at opposite ends of the center panel 1610, and a first locking panel 1614 and a second locking panel 1616 disposed at opposite ends of the center panel 1610. Each side flap panel 1618*a,b* can comprise a side subpanel 1540*a,b* respectively attached to the center panel 1610 and a flap subpanel 1640*a,b* disposed opposite from the center panel 1610. Each side subpanel 1540*a,b* can comprise a side tab 1642*a,b*, respectively. Each side tab 1642*a,b* can be cut out from the respective flap subpanel 1640*a,b* by a side tab cutout 1643*a,b*, respectively. Each side tab 1642*a,b* can be configured to extend outwards from the flap subpanel 1640*a,b* when the side tabs 1642*a,b* are folded relative to the flap subpanels 1640*a,b*.

The first locking panel 1614 can comprise a side subpanel 1532*a* attached to the center panel 1610 and a first locking subpanel 1510 disposed opposite from the center panel 1610. The first locking subpanel 1510 can comprise a pair of wings 1512*a,b*, and each wing 1512*a,b* can define a locking slot 1514*a,b*. The first locking subpanel 1510 can also comprise a channel tab 1530*a* which can be cut out from the side subpanel 1532*a*. The channel tab 1530*a* can be configured to extend outwards from the side subpanel 1532*a* when the first locking subpanel 1510 is folded relative to the side subpanel 1532*a*.

The second locking panel 1616 can comprise a side subpanel 1532*b* attached to the center panel 1610 and a second locking subpanel 1520 disposed opposite from the center panel 1610. The second locking subpanel 1520 can comprise a pair of locking tabs 1522*a,b* which can be hingedly attached to the second locking subpanel 1520. A pair of locking notches 1624*a,b* can be defined between the second locking subpanel 1520 and the locking tabs 1522*a,b*. The second locking subpanel 1520 can also comprise a channel tab 1530*b* which can be cut out from the side subpanel 1532*b*. The channel tab 1530*b* can be configured to extend outwards from the side subpanel 1532*b* when the second locking subpanel 1520 is folded relative to the side subpanel 1532*b*.

In an assembled configuration shown in FIG. 15, the side subpanels 1532*a,b*, 1540*a,b* can define four sides of the inner box 1500. The center panel 1610 can define a bottom panel of the inner box 1500. The first locking subpanel 1510 and the second locking subpanel 1520 can overlap to define a top panel of the inner box 1500. The side flap panels 1618*a,b* can be folded inwards so that the flap subpanels 1640*a,b* lie flat against the first locking subpanel 1510 and the second locking subpanel 1520. The side tabs 1642*a,b* can engage the locking slots 1514*a,b* of the first locking subpanel 1510 to prevent the side flap panels 1618*a,b* from unfolding. Additionally, locking tabs 1522*a,b* can extend through the locking slots 1514*a,b* and through openings defined by the side tap cutouts 1643*a,b* to prevent the side flap panels 1618*a,b* from unfolding.

Figure 17:
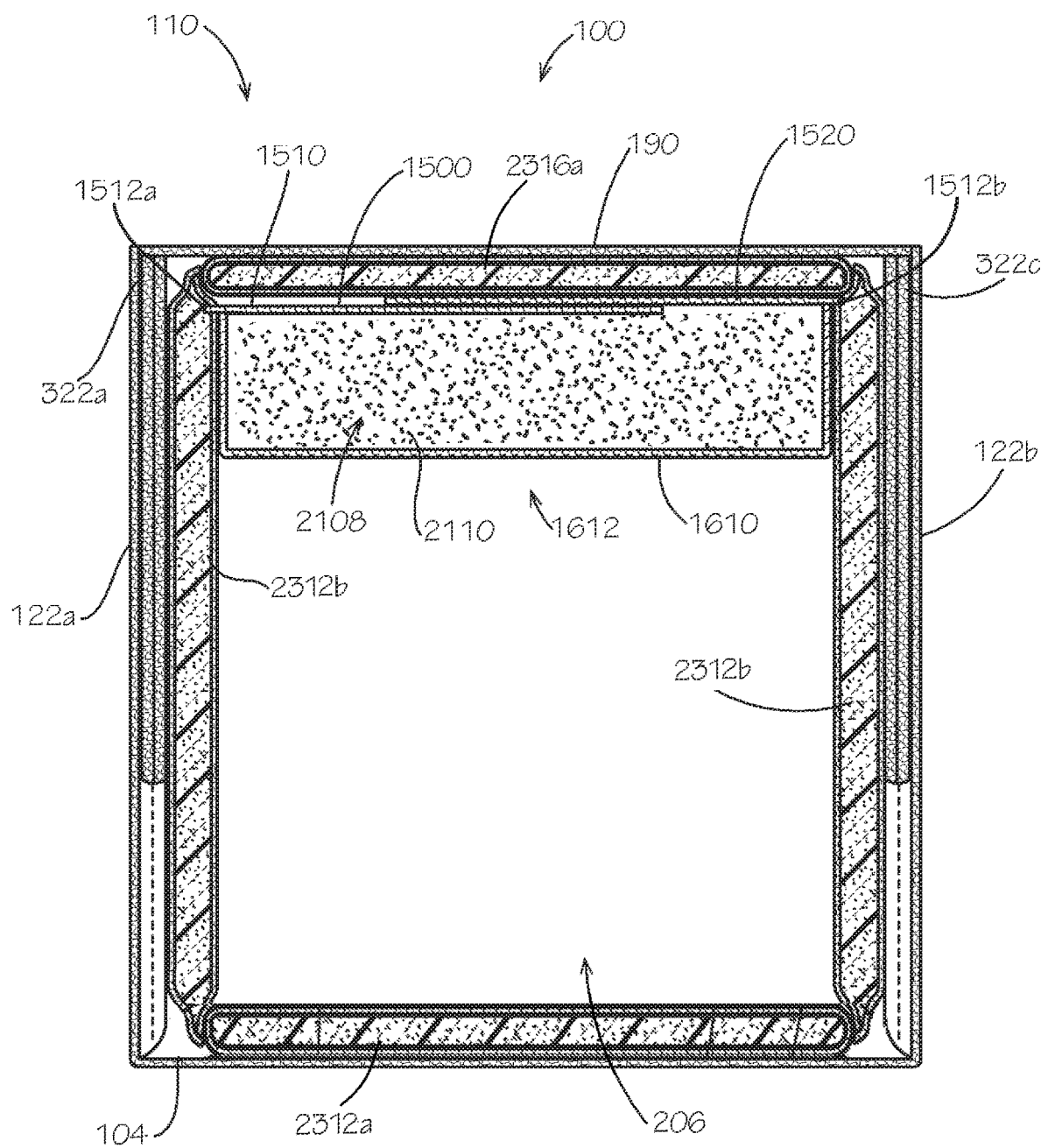
FIG. 17 is a side cross-section of the modular box assembly of FIG. 12, further comprising the inner box of FIG. 15, in accordance with another aspect of the present disclosure.
Figure 18:
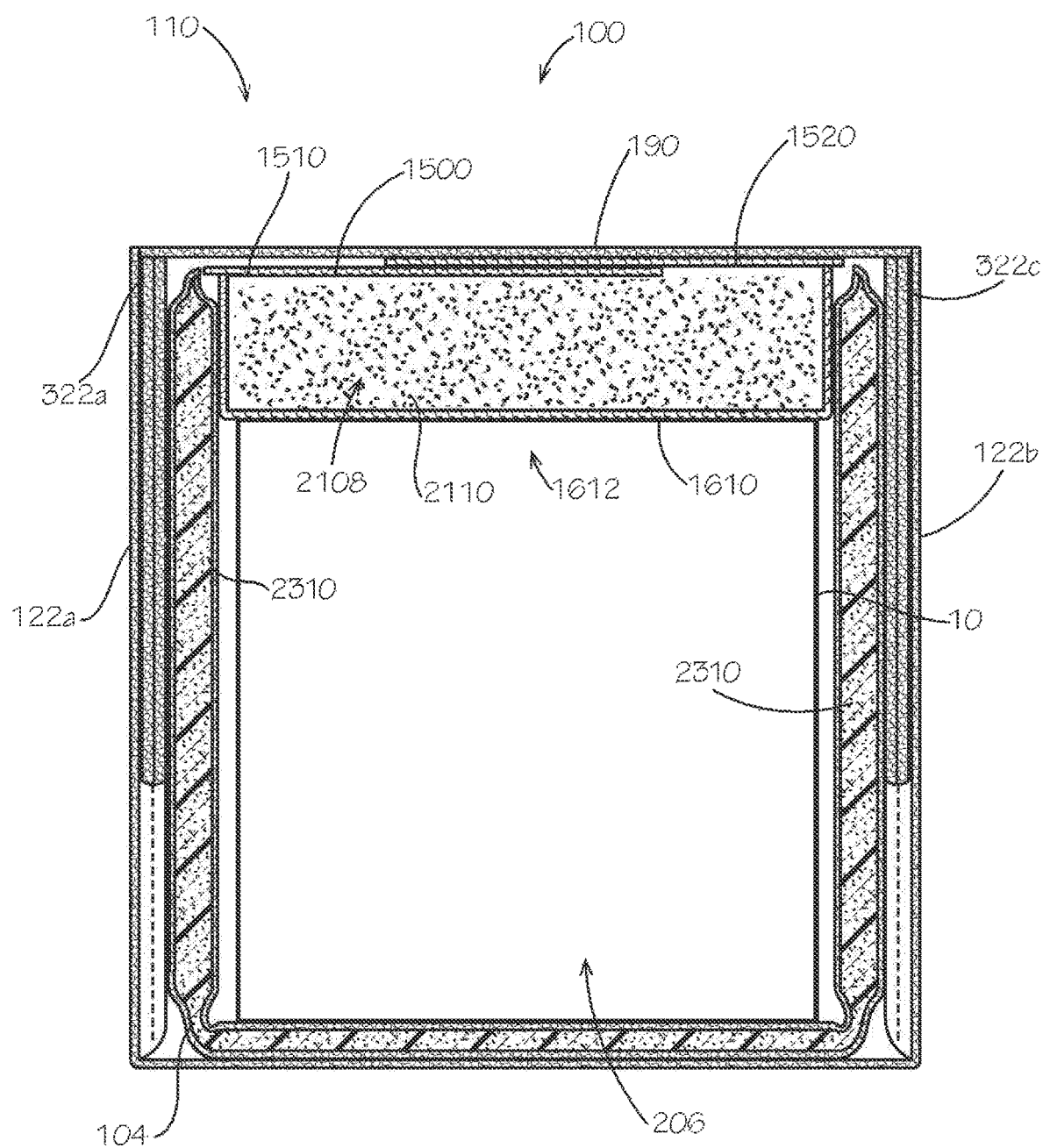
FIG. 18 is a side cross-section of the modular box assembly of FIG. 12, further comprising the inner box of FIG. 15, in accordance with another aspect.

With the locking tabs 1522*a,b* extending through the locking slots 1514*a,b*, the first locking subpanel 1510 can be secured to the second locking subpanel 1520. The locking notches 1624*a,b* can engage the locking slots 1514*a,b* to prevent withdrawal of the locking tabs 1522*a,b* from the locking slots 1514*a,b*. The second locking subpanel 1520 can be positioned overlapping the first locking subpanel 1510, and the locking tabs 1522*a,b* can be inserted through the locking slots 1514*a,b* to secure the first locking subpanel 1510 to the second locking subpanel 1520. In one aspect, the inner box 1500 can be sized to fit closely within the box cavity 206. Optionally, the wings 1512*a,b* of the inner box can contact the side panels 112*a,b*. In some aspects, the channel tabs 1530*a,b* of the inner box 1500 can extend outwards from the inner box and engage a portion of the liner 2310, such as the border 158 of the liner, to secure and suspend the inner box 1500 within the box cavity 206, as shown in FIG. 17. In other aspects, however, the inner box 1500 can be sized to fit closely within the box cavity can be positioned on contents 10 of the box, as shown in FIG. 18. That is, in some aspects, the inner box 1500 can be positioned directly on the contents 10 of the box 101 in the box cavity 206 regardless of the presence or absence of the liner 2310.

For example, if the liner 2310 is orientated as in FIG. 13 with the first liner side panel 2316*a* of the first liner 2312*a* covering the box opening 106, the inner box 1500 can be placed in the box cavity 206 by lifting the first liner side panel 2316*a* of the first liner 2312*a* like a lid which can be opened and closed. The inner box 1500 can engage a portion of the second liner 2312*b* to secure and suspend the inner box 1500 within the box cavity 206, and the first liner side panel 2316*a* can be lower into the box cavity 206 over the inner box 1500. Alternatively, in another example, if the liner 2310 is orientated as in FIG. 13 with the first liner side panel 2316*a* of the first liner 2312*a* covering the box opening 106, the inner box 1500 can be placed in the box cavity 206 by lifting the first liner side panel 2316*a* of the first liner 2312*a*. The inner box 1500 can be positioned directly on the contents 10 of the box 101 in the box cavity 206 and the first liner side panel 2316*a* can be lower into the box cavity 206.

In one aspect, the inner box 1500 can contain a temperature maintaining material 2110 positioned within a cavity 2108 of the inner box. In some aspects, the inner box 1500 can contain a cooling material, such as, for example and without limitation, carbon dioxide dry ice, configured to keep contents of the insulated box 110 cold or frozen. In such aspects, as the dry ice sublimes into carbon dioxide gas, the cold carbon dioxide gas can pass downwards from the inner box 1500 through a plurality of vents 1612 defined by the center panel 1610, which can be oriented as the bottom panel. The inner box can prevent a user from making direct contact with the dry ice by which can cause burns to bare skin. In other aspects, the inner box 1500 can contain a different temperature maintaining material configured to cool the insulated box 110. For example, in some aspects, the temperature maintaining material 2110 can be a mixture of materials configured to undergo a controlled endothermic reaction. For example and without limitation, the temperature maintaining material can comprise water, ammonium nitrate, calcium ammonium nitrate, and/or urea in a container which can undergo an endothermic reaction as the water dissolves solid material in the container, as commonly used in so-called "instant ice packs". In such aspects, the temperature maintaining material 2110 can absorb heat through the endothermic reaction.

In other aspects, the temperature maintaining material 2110 can be a heat emitting material configured to keep contents of the insulated box 110 warm or hot. For example and without limitation, the inner box 1500 can contain heat packs which emit residual heat from a heated material defining a high specific heat capacity. For example, a heated water bottle or bag can emit residual heat over time. In other aspects, the inner box can contain a heat emitting material which can undergo a controlled exothermic reaction to produce heat within the insulated box 110. One example can include a pouch of supersaturated crystallizing solution, such as, for example and without limitation, sodium acetate, which release heat as crystallization occurs. Another example can be a mixture which can comprise cellulose, iron, activated carbon, vermiculite, and/or salt which can release heat as oxygen oxidizes the iron. In such aspects, the temperature maintaining material 2110 can produce heat through the exothermic reaction.

In the present aspect, the first sheet 352 and the second sheet 354 of the liner 2310 can comprise paper, such as kraft paper; however, in other embodiments, the sheets can comprise posterboard, cardboard, plastic sheeting, cellulose film, cloth, or any other suitable material. In some aspects, the sheets can comprise a water-proof or water-resistant material, such as water-proof paper. In some aspects, at least one of the first sheet 352 and the second sheet 354 of the liner can comprised a material different from another of the sheets. In the present aspect, the box 101 can comprise a paper fiber-based material such as corrugated cardboard or poster board; however, the box can be comprised of any suitable rigid board material such as wood, plastic, metal, or any other material.

The insulation batt 350 of the liner 2310 can comprise paper or other paper fiber materials; however, in other aspects, the insulation batts can comprise cotton, foam, rubber, plastics, fiberglass, mineral wool, or any other flexible insulation material. In the present application, the insulation batt can be repulpable. In the present aspect, the modular box assembly 100 can be 100% recyclable. In the present aspect, the modular box assembly can be single-stream recyclable wherein all materials comprised by the modular box assembly 100 can be recycled by a single processing train without requiring separation of any materials or components of the modular box assembly. In the present aspect, the modular box assembly 100 can be compostable. In the present aspect, the modular box assembly can be repulpable. In the present aspect, the modular box assembly 100 and at least each of the box 101, the box top 190 and the liner 2310 can be repulpable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill. which is hereby incorporated in its entirety. In the present aspect, the modular box assembly 100 and at least each of the box 101, the box top 190 and the liner 2310 can be recyclable in accordance with the requirements of the Aug. 16, 2013, revision of the "Voluntary Standard For Repulping and Recycling Corrugated Fiberboard Treated to Improve Its Performance in the Presence of Water and Water Vapor" provided by the Fibre Box Association of Elk Grove Village, Ill.

Recyclable and repulpable insulation materials are further described in U.S. Patent Application No. 62/375,555, filed Aug. 16, 2016, U.S. Patent Application No. 62/419,894, filed Nov. 9, 2016, and U.S. Patent Application No. 62/437,365, filed Dec. 21, 2016, which are each incorporated by reference in their entirety herein.

The modular box assembly 100 can be used in applications in which a user wants to quickly open a box from the collapsed configuration of FIG. 9 to the expanded configuration of FIG. 1. In one aspect, by exerting a force upon at least one of the side panels 112a,b 122a,b in a direction towards the bottom end 104, with the center subpanel 380 held in place can cause the box to self-expand into an expanded configuration with a substantially rectangular prism shape. That is, by placing the center subpanel on a surface, such as the ground and pushing the box 101 against the ground can cause the box to self-expand into an expanded. The self-expanding action can be desirable to allow for quick and easy reconfiguration of the box 101, unlike many boxes which must be folded and taped together. The box can be shipped and stored in the collapsed configuration for space-efficient packing, and a user can simply press upon the center subpanel 380, such as by pressing the center subpanel against the ground, and the box 101 can reconfigure to the expanded configuration.

If an insulated box 110 is desired, with the box in the expanded configuration, the user can insert the liner 2310 into the box cavity 206. If further temperature control is desired, the inner box 1500 containing the temperature maintaining material 2110 can also be positioned within the box cavity.

The modular box assembly 100 can be used in applications in which a user or mail carrier transports perishable or temperature-sensitive goods, such as frozen, chilled, or hot goods. For example and without limitation, the modular box assembly 100 can be used to transport groceries, medications, electronics, or any other goods. The modular box assembly 100 can improve upon a common cardboard box by providing recyclable insulation to prevent spoilage of the contents. The modular box assembly 100 can also be used to deliver hot goods, such as warm foods.

In order to ship temperature-sensitive goods, common cardboard boxes are often packed with insulating materials made of plastics or foams which are not accepted by many recycling facilities or curb-side recycling programs in which a waste management service collects recyclables at a user's home. Consequently, shipping temperature-sensitive goods often produces non-recyclable waste which is deposited in landfills. The insulation materials often decompose very slowly, sometimes over the course of several centuries. In some instances, non-recyclable and non-biodegradable insulating materials can enter the oceans where the insulation materials can remain for years and harm marine life. In some aspects, the modular box assembly 100 can reduce waste and pollution by comprising materials which are recyclable or biodegradable. In aspects in which the modular box assembly 100 is curb-side or single-stream recyclable, the user may be more likely to recycle the modular box assembly 100 due to the ease of curb-side collection.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations That which is claimed is:

1. A box comprising:
a side panel;
a bottom panel attached to the side panel, the side panel and bottom panel at least partially defining a box cavity, the bottom panel defining:
four bottom panel corners;
a center subpanel defining a rectangle, the rectangle comprising:
a first pair of edge fold lines extending in a longitudinal direction;
a second pair of edge fold lines extending transverse to the first pair of edge fold lines; and four subpanel corners, each subpanel corner joining one of the first pair of edge fold lines to one of the second pair of edge fold lines; and a V-shaped fold line comprising a first fold line extending from a first one of the bottom panel corners to a longitudinal center line of the bottom panel and a second fold line extending from a second one of the bottom panel corners to the longitudinal center line, wherein the first fold line and second fold line meet at an apex along the longitudinal center line; and an insulating liner received in the box cavity.

2. The box of claim 1, wherein the bottom panel is symmetric about the longitudinal center line.

3. The box of claim 1, wherein the V-shaped fold line is a first V-shaped fold line, and the bottom panel further comprises a second V-shaped fold line.

4. The box of claim 1, further comprising a first corner fold line extending from the first one of the bottom panel corners to a first one of the subpanel corners.

5. The box of claim 1, wherein the bottom panel is symmetric about a transverse center line that is perpendicular to the longitudinal center line.

6. The box of claim 1, wherein the bottom panel comprises a center fold line substantially aligned with the longitudinal center line.

7. The box of claim 1, wherein the side panel is a first side panel, and the box further comprises:

a third side panel opposed to the first side panel, a second side panel positioned between and coupled to the first side panel and the third side panel, and a fourth side panel opposed to the second side panel, the fourth side panel being positioned between and coupled to the first and third side panels.

8. The box of claim 7, wherein a center fold line extends across each of the bottom panel, first side panel, and the third side panel.

9. The box of claim 7, further comprising:

a first wing attached to a side of the first side panel; and a second wing attached to the first wing and to the second side panel.

10. The box of claim 9, wherein the box is symmetric about the longitudinal center line.

11. The box of claim 1, wherein:

the box is configured to collapse to a collapsed configuration; and a width between the first pair of edge fold lines is approximately a thickness of the box in the collapsed configuration.

12. The box of claim 9 wherein:

each one of the panels or wings defines a layer; and the thickness of the collapsed configuration comprises eight layers.

* * * * *